US007804971B2

(12) United States Patent
Matsuzawa

(10) Patent No.: US 7,804,971 B2
(45) Date of Patent: Sep. 28, 2010

(54) ELECTROSTATIC ULTRASONIC TRANSDUCER, ULTRASONIC SPEAKER AND DISPLAY DEVICE

(75) Inventor: Kinya Matsuzawa, Shiojiri (JP)

(73) Assignee: Seiko Epson Corporation (JP)

( * ) Notice: Subject to any disclaimer, the term of this patent is extended or adjusted under 35 U.S.C. 154(b) by 1037 days.

(21) Appl. No.: 11/535,101

(22) Filed: Sep. 26, 2006

(65) Prior Publication Data

US 2007/0071261 A1 Mar. 29, 2007

(30) Foreign Application Priority Data

Jul. 11, 2005 (JP) ............................. 2006-190587
Sep. 27, 2005 (JP) ............................. 2005-279251

(51) Int. Cl.
*H04R 25/00* (2006.01)
*H04R 3/00* (2006.01)
*H02N 1/00* (2006.01)
*H01B 19/00* (2006.01)

(52) U.S. Cl. ....................... 381/191; 381/116; 310/309; 29/886

(58) Field of Classification Search ................. 381/111, 381/116, 174, 190, 191; 367/137, 138, 170; 310/309; 29/886
See application file for complete search history.

(56) References Cited

U.S. PATENT DOCUMENTS 2,864,899 A * 12/1958 Parker ........................ 381/191
5,450,498 A * 9/1995 Whitehead .................. 381/191
6,775,388 B1 * 8/2004 Pompei ...................... 381/191
6,829,131 B1 * 12/2004 Loeb et al. .................. 361/234

FOREIGN PATENT DOCUMENTS

JP 2000-50387 2/2000
JP 2000-50392 2/2000

* cited by examiner

*Primary Examiner*—Curtis Kuntz
*Assistant Examiner*—Jesse A Elbin
(74) *Attorney, Agent, or Firm*—Harness, Dickey & Pierce, P.L.C.

(57) ABSTRACT

The present invention relates to a push-pull type electrostatic ultrasonic transducer, particularly, an electrostatic ultrasonic transducer capable of generating usual sound pressure with lower energy, and thereby, reducing voltage (lowering power); wherein the spacing between the electrodes and vibrating film is set to a specific distance.

3 Claims, 13 Drawing Sheets

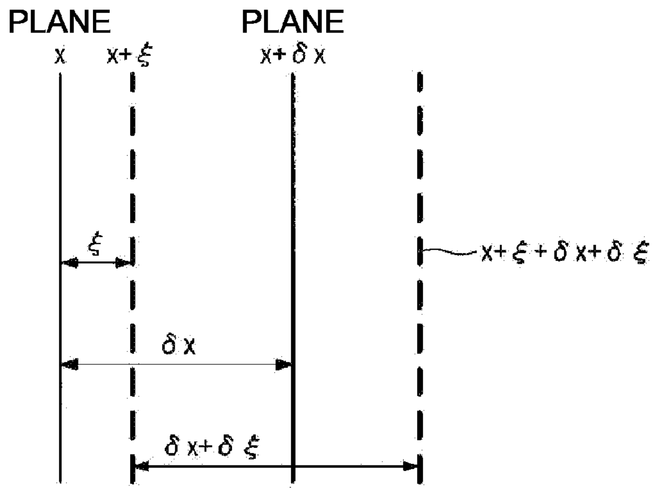
FIG. 3
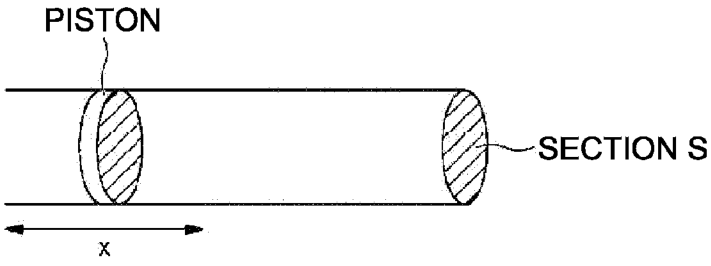
FIG. 4
| P (dB) | f (kHz) | | |
|---|---|---|---|
| | 40 | 50 | 60 |
| 130 | 0. 863138867 | 0. 690511093 | 0. 575425911 |
| 140 | 2. 729484756 | 2. 183587805 | 1. 819656504 |
| 150 | 8. 631388667 | 6. 905110934 | 5. 754259112 |
AMPLITUDE a (μm)
FIG. 5

IN THE CASE OF t2 = 10μm

| D1 (mm) | t1 (μm) | | |
|---|---|---|---|
| | 6 | 9 | 12 |
| 0. 7 | 0. 51 | 0. 62 | 0. 69 |
| 0. 9 | 0. 53 | 0. 63 | 0. 71 |
| 1. 1 | 0. 54 | 0. 65 | 0. 72 |
| 1. 5 | 0. 57 | 0. 68 | 0. 74 |

IN THE CASE OF t2 = 20μm

| D1 (mm) | t1 (μm) | | |
|---|---|---|---|
| | 6 | 9 | 12 |
| 0. 7 | 0. 33 | 0. 43 | 0. 51 |
| 0. 9 | 0. 34 | 0. 45 | 0. 53 |
| 1. 1 | 0. 36 | 0. 46 | 0. 54 |
| 1. 5 | 0. 38 | 0. 49 | 0. 57 |

ELECTROSTATIC ULTRASONIC TRANSDUCER, ULTRASONIC SPEAKER AND DISPLAY DEVICE

BACKGROUND OF THE INVENTION

1. Technical Field

The present invention relates to a push-pull type electrostatic ultrasonic transducer, particularly, an electrostatic ultrasonic transducer capable of generating usual sound pressure with lower energy, and thereby, reducing voltage (lowering power), an ultrasonic speaker using the same, a method of designing the electrostatic ultrasonic transducer, a method of reproducing sound signal by means of the electrostatic ultrasonic transducer, an apparatus for designing the electrostatic ultrasonic transducer, a program for designing the electrostatic ultrasonic transducer, a method of manufacturing a fixed electrode of the electrostatic ultrasonic transducer, an ultra directional acoustic system and a display device.

2. Related Art

An electrostatic ultrasonic transducer has been usually known as a wide band oscillation type ultrasonic transducer capable of generating high sound pressure over a high frequency band. FIG. 7 shows an example of a structure of a wide band oscillation type ultrasonic transducer. The electrostatic ultrasonic transducer in FIG. 7 is called "the pull type" since it operates only in a direction that an oscillation film is pulled to a fixed electrode side.

The electrostatic ultrasonic transducer shown in FIG. 7 uses a dielectric 131 (an insulator) such as PET (polyethylene terephthalate resin) having around 3 to 10 μm in thickness as an oscillator (an oscillation film). An upper electrode 132 formed as metallic foil such as aluminum is formed into one body with the dielectric 131 on an upper surface of the dielectric 131 in a process such as vapor deposition. A lower electrode 133 made of brass is provided so as to be in contact with a lower surface of the dielectric 131. The lower electrode 133 is connected to a lead 152 and fixed to a base plate 135 made of Bakelite or the like.

The upper electrode 132 is connected to a lead 153, which is connected to a direct current bias power source 150. Around 50 to 150 V of direct current bias voltage for adherence of the upper electrode is always applied to the upper electrode 132 from the direct current bias power source 150 so that the upper electrode 132 would adhere to a lower electrode 133 side. 151 denotes a signal source.

The dielectric 131, the upper electrode 132 and the base plate 135 are fastened together with metal rings 136, 137 and 138 and a mesh 139 by means of a case 130.

On a surface of the lower electrode 133 on the dielectric 131 side, formed are plural minute grooves, which are not uniform in shape and around tens to hundreds μm in size. The minute groove forms a gap between the lower electrode 133 and the dielectric 131. Accordingly, distribution of electrostatic capacity between the upper electrode 132 and the lower electrode 133 varies slightly. The surface of the lower electrode 133 is manually roughed by means of a rasp in order to form the random minute grooves. In an electrostatic ultrasonic transducer, forming numberless condensers different in size and depth of a gap as described above allows frequency characteristics to be in a wide band (refer to JP-A-2000-50387 and JP-A-2000-50392, for example).

As described above, the electrostatic ultrasonic transducer shown in FIG. 7 has been usually known as a wide band ultrasonic transducer (of the pull type) capable of generating comparatively high sound pressure over a wide band.

The maximum value of the sound pressure, however, is low a little such as 120 dB or less, for example. This is insufficient a little in sound pressure for using the electrostatic ultrasonic transducer as an ultrasonic speaker. In order to obtain a sufficient parametric effect in an ultrasonic speaker, required is 120 dB or more of ultrasonic sound pressure. The electrostatic ultrasonic transducer (of the pull type), however, is difficult to achieve the above numerical value. Accordingly, a ceramic piezoelectric element such as PZT or a high-polymer piezoelectric element such as PVDF has been mostly used as an ultrasonic generator. The piezoelectric element, however, has a sharp resonance point regardless of a material and is driven at a frequency of the resonance to be put to practical use as an ultrasonic speaker. This causes an extremely small range of the frequency capable of securing high sound pressure, that is, a narrow band.

In order to solve such a problem, it is conceivable to provide an electrostatic ultrasonic transducer shown in FIG. 1 to which a designing method in accordance with the invention is applied. A structure of the above is generally called a push-pull type. Details of the structure and an operation thereof are described later. The ultrasonic transducer shown in FIG. 1 can simultaneously satisfy both of a wide band characteristic and the high sound pressure, differently from the pull type electrostatic ultrasonic transducer.

In the push-pull type electrostatic ultrasonic transducer shown in FIG. 1, an important problem is particularly the height "t" of convexes of fixed electrodes 10A and 10B (the height of a step of a hole with the step). The height "t" of convexes of the fixed electrodes 10A and 10B (the height of a step of a hole with the step) is usually set with a little room empirically at 10 to 20 μm, for example. Setting the height "t" of the convex high as described above causes requirement of high driving alternating current voltage corresponding to the above and excessive consumption of energy and this causes a problem. Accordingly, required is to provide a method of quantitatively designing the optimum height "t" of the convex on the basis of values of desired sound pressure and driving frequency.

Quantitatively obtaining the optimum height "t" of the convex allows an efficient structure with which desired pressure can be obtained at low driving voltage to be put into practice. In other words, the equal sound pressure can be generated with lower energy, so that the electrostatic ultrasonic transducer can be practically reduced in voltage (lowered in power).

As described above, in the push-pull type electrostatic ultrasonic transducer shown in FIG. 1, required is to provide a method of quantitatively designing the height "t" of a convex of the fixed electrodes 10A and 10B (the height of a step of a hole with the step). Quantitatively obtaining the optimum height "t" of the convex allows an efficient structure with which desired pressure can be obtained at low driving voltage to be put into practice. This allows the equal sound pressure to be generated with lower energy. That is to say, the electrostatic ultrasonic transducer can be practically reduced in voltage (lowered in power).

SUMMARY

An advantage of the invention is to provide a push-pull type electrostatic ultrasonic transducer capable of quantitatively obtaining the height of a convex of a fixed electrode to generate a sound pressure equal to the usual case with energy less than the usual case for the purpose of reducing voltage (lowering power).

Another advantage of the invention is to provide an ultrasonic speaker using the push-pull type electrostatic ultrasonic transducer, a method of designing the electrostatic ultrasonic transducer, an apparatus for designing the electrostatic ultrasonic transducer, a program of designing the electrostatic ultrasonic transducer, a method of reproducing a sound signal, a manufacturing method, an ultra directional acoustic system and a projector.

An ultrasonic transducer according to an aspect of the invention is an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula:

$$a=(1/\pi f)\sqrt{\{(I_o\cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a".

In accordance with such a structure, in the push-pull type electrostatic ultrasonic transducer shown in FIG. 1, for example, a formula for setting the height "t" of a step of a hole with the step at an optimum value is defined when the desired sound pressure and the driving frequency are given. The formula is given as follows:

$$a=(1/\pi f)\sqrt{\{(I_o\cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the desired sound pressure is P (dB), the driving frequency is f (Hz) and a value of one side amplitude of the film oscillation is "a" (m).

Then, a value exceeding and as close as possible to a value of the amplitude of the film oscillation, which is calculated with the above formula, (at least within a range that the oscillation film does not contact with an electrode due to oscillation) is designed as the height "t" of a step of a hole with the step of the fixed electrode to form an ultrasonic transducer in which the fixed electrode is designed in the above method.

This allows the optimum height "t" of the convex to be designed on the basis of the values of the desired sound pressure and the driving frequency. As a result, the structure of the electrostatic ultrasonic transducer becomes superior in efficiency, so that desired sound voltage can be obtained with less driving voltage. In other words, it is possible to generate a sound pressure equal to that of the usual technology with less energy, so that the electrostatic ultrasonic transducer can be practically reduced in voltage (lowered in power).

A method of designing an ultrasonic transducer according to an aspect of the invention is a method of designing an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of fixed electrodes and the oscillation film, the method comprising:

calculating a value "a" of one side amplitude of the film oscillation by the following formula:

$$a=(1/\pi f)\sqrt{\{(I_o\cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m); and setting a height of a step part provided in an outer circumference of the through hole on the respective oscillation film sides of the pair of electrodes in a direction of the oscillation film side at a value exceeding and close to the one side amplitude value "a".

In accordance with such a process, in the push-pull type electrostatic ultrasonic transducer shown in FIG. 1, for example, a formula for setting the height "t" of a step of a hole with the step at an optimum value is defined when the desired sound pressure and the driving frequency are given. The formula is given as follows:

$$a=(1/\pi f)\sqrt{\{(I_o\cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the desired sound pressure is P (dB), the driving frequency is f (Hz) and a value of one side amplitude of the film oscillation is "a" (m).

Then, a value exceeding and as close as possible to a value of the amplitude of the film oscillation, which is calculated with the above formula, (at least within a range that the oscillation film does not contact with an electrode due to oscillation) is designed as the height "t" of a step of a hole with the step of the fixed electrode to form an ultrasonic transducer in which the fixed electrode is designed in the above method.

This allows the optimum height "t" of the convex to be designed on the basis of the values of the desired sound pressure and the driving frequency. As a result, the structure of the electrostatic ultrasonic transducer becomes superior in efficiency, so that desired sound voltage can be obtained with less driving voltage. In other words, it is possible to generate a sound pressure equal to that of the usual technology with less energy, so that the electrostatic ultrasonic transducer can be practically reduced in voltage (lowered in power).

An apparatus for designing an ultrasonic transducer according to an aspect of the invention is an apparatus of designing an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of fixed electrodes and the oscillation film, the apparatus of designing an electrostatic ultrasonic transducer comprising:

an operating unit for calculating a value "a" of one side amplitude of the film oscillation by the following formula:

$$a=(1/\pi f)\sqrt{\{(I_o \cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m); and a setting unit for setting a height of a step part provided in an outer circumference of the through hole on the respective oscillation film sides of the pair of electrodes in a direction of the oscillation film side as an oscillation film holding part at a value exceeding and close to the one side amplitude value "a".

In accordance with such a structure, the operation unit calculates the value "a" of one side amplitude of the film oscillation by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m) while the setting unit sets a height of a step part provided in an outer circumference of the through hole on the respective oscillation film sides of the pair of electrodes as an oscillation film holding part at a value exceeding and close to the one side amplitude value "a" (at least within a range that the oscillation film does not contact with an electrode due to oscillation).

This allows the optimum height "t" of the convex to be designed on the basis of the values of the desired sound pressure and the driving frequency. As a result, the structure of the electrostatic ultrasonic transducer becomes superior in efficiency, so that a desired sound voltage can be obtained with less driving voltage. In other words, it is possible to generate a sound pressure equal to that of the usual technology with less energy, so that the electrostatic ultrasonic transducer can be practically reduced in voltage (lowered in power).

A program for designing an electrostatic ultrasonic transducer according to an aspect of the invention is a program for designing an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of fixed electrodes and the oscillation film, the program for designing an electrostatic ultrasonic transducer for letting a computer execute: a first step for calculating a value "a" of one side amplitude of the film oscillation by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m); and a second step for setting a height of a step part provided in an outer circumference of the through hole on the respective oscillation film sides of the pair of electrodes in a direction of the oscillation film side at a value exceeding and close to the one side amplitude value "a".

In accordance with the above structure, the computer is let execute the program for designing an electrostatic ultrasonic transducer for letting a computer execute: a first step for calculating a value "a" of one side amplitude of the film oscillation by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m); and a second step for setting a height of a step part provided in an outer circumference of the through hole on the respective oscillation film sides of the pair of electrodes in a direction of the oscillation film side at a value exceeding and close to the one side amplitude value "a". This allows the optimum height "t" of the convex to be designed on the basis of the values of the desired sound pressure and the driving frequency. As a result, the structure of the electrostatic ultrasonic transducer becomes superior in efficiency, so that a desired sound voltage can be obtained with less driving voltage. In other words, it is possible to generate a sound pressure equal to that of the usual technology with less energy, so that the electrostatic ultrasonic transducer can be practically reduced in voltage (lowered in power).

An ultrasonic speaker in accordance with an aspect of the invention is an ultrasonic speaker comprising:

an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula:

$$a=(1/\pi f)\sqrt{\{(I_o \cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a";

a signal source for generating a signal wave in an audible frequency band;

a carrier wave supplying unit for generating and outputting a carrier wave in an ultrasonic frequency band; and a modulating unit for modulating the carrier wave by means of the signal wave in the audible frequency band, the signal wave being outputted from the signal source, wherein the electrostatic ultrasonic transducer is driven on the basis of a modulated signal applied between the fixed electrode and an electrode layer of the oscillation film and outputted from the modulating unit.

This results in an efficient structure of the ultrasonic speaker, so that a desired sound voltage can be obtained with less driving voltage. That is to say, it is possible to generate a sound pressure equal to that of the ultrasonic speaker of the usual technology with less energy, and therefore, the ultrasonic speaker can be practically reduced in voltage (lowered in power).

A method of reproducing a sound signal of the ultrasonic transducer in accordance with an aspect of the invention is a method of reproducing a sound signal of an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula: $a=(1/\pi f)\sqrt{\{(I_o \cdot 10^{P/10})/2\rho_o c\}}$ wherein Io denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a", the method of reproducing a sound signal comprising: generating a signal wave in an audible frequency band by means of a signal source; generating a carrier wave in an ultrasonic frequency band by means of a carrier wave supplying source; generating a modulated signal obtained by modulating the carrier wave by means of the signal wave in the audible frequency band; and driving the electrostatic ultrasonic transducer by applying the modulated signal between the fixed electrode and an electrode layer of the oscillation film.

In accordance with a method of reproducing a sound signal of an electrostatic ultrasonic transducer including such processes, a signal wave in an audible frequency band is generated by means of a signal source and a carrier wave in an ultrasonic frequency band is generated and outputted by means of a carrier wave supplying source. The carrier wave is then modulated by means of the signal wave in the audible frequency band and the modulated signal is applied between the fixed electrode and an electrode layer of the oscillation film to drive the electrostatic ultrasonic transducer.

This allows the electrostatic ultrasonic transducer having such a structure to contribute to output of an acoustic signal at a sound pressure level high enough for achieving a parametric array effect over a wide frequency band and to reproduction of a sound signal.

A method of manufacturing of an ultrasonic transducer in accordance with an aspect of the invention is a method of manufacturing an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, the method comprising: coating a conductive plate for forming a fixed electrode part of the pair of electrodes with a mask member provided with a pattern of through holes to form the through holes on the conductive plate in an etching process; and obtaining a value "a" of one side amplitude of the film oscillation by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the desired sound pressure outputted from the electrostatic ultrasonic transducer is P (dB), the driving frequency is f (Hz) and a value of one side amplitude of the film oscillation of the oscillation film, which is being driven, is "a" (m) and setting a height of a step part provided in an outer circumference of the through hole on the respective oscillation film sides of the pair of fixed electrodes in a direction of the oscillation film side at a value exceeding and close to the one side amplitude value "a".

In accordance with the method of manufacturing an electrostatic ultrasonic transducer comprising the above processes, a conductive plate for forming a fixed electrode part of the pair of fixed electrodes is coated with a mask member provided with a pattern of through holes to form the through holes on the conductive plate in an etching process. A value "a" of one side amplitude of the film oscillation is obtained by the following formula: $a=(1/\pi f)\sqrt{\{(I_o \cdot 10^{P/10})/2\rho_o c\}}$ wherein Io denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the desired sound pressure outputted from the electrostatic ultrasonic transducer is P (dB), the driving frequency is f (Hz) and a value of one side amplitude of the film oscillation of the oscillation film, which is being driven, is "a" (m) and a height of a step part provided in an outer circumference of the through hole on the respective oscillation film sides of the pair of fixed electrodes, the step part being an oscillation film holding part, is set at a value exceeding and close to the one side amplitude value "a" (at least within a range that the oscillation film does not contact with an electrode due to oscillation).

This allows the height of the convex of the fixed electrode to be quantitatively obtained to generate sound pressure equal to the usual case with energy less than the usual case. Accordingly, it is possible to obtain an electrostatic ultrasonic transducer reduced in voltage (lowered in power).

Further, a method of manufacturing an ultrasonic transducer in accordance with another aspect of the invention is a method of manufacturing an electrostatic ultrasonic transducer, comprising: forming a non-conductive photosensitive resist used as an oscillation film holding part forming member on the conductive plate provided with the through holes into the predetermined thickness; coating a surface of the non-conductive photosensitive resist with a mask member for forming the oscillation film holding part, the mask member being provided with a pattern of the oscillation film holding pattern, to carry out exposure; and stripping the mask member for forming the oscillation film holding part to remove an unnecessary part of the photosensitive resist by development.

In accordance with the method of manufacturing an electrostatic ultrasonic transducer comprising the above processes, a non-conductive photosensitive resist used as an oscillation film holding part forming member is formed on the conductive plate provided with the through holes into the predetermined thickness, a surface of the non-conductive photosensitive resist is coated with a mask member for forming the oscillation film holding part, the mask member being provided with a pattern of the oscillation film holding pattern, to carry out exposure and the mask member for forming the oscillation film holding part is stripped to remove an unnecessary part of the photosensitive resist by development. Accordingly, processes after the metal electroforming process, the processes having been required, can be made unnecessary. This allows the manufacturing process to be shortened and manufacturing cost to be reduced. Further, a solvent or such (mainly a strong alkaline solvent) used in a process of stripping the remaining resist is not necessary, so that improvement in environment can be expected.

Moreover, a method of manufacturing an electrostatic ultrasonic transducer in accordance with another aspect of the invention is a method of manufacturing an electrostatic ultrasonic transducer comprising: setting a screen printing plate and a liquid oscillation film holding part forming member on a surface of the conductive plate provided with the through holes, the screen printing plate being formed from a mask member for forming the oscillation film holding part forming member; moving a squeegee simultaneously with application of the oscillation film holding part forming member to a part coated with no the mask member after setting the screen printing plate and the liquid oscillation film holding part forming member on a surface of the conductive plate provided with the through holes; and removing the screen printing plate to dry the oscillation film holding part forming member left on the surface of the conductive plate after applying the oscillation film holding part forming member to a part without the mask member.

In accordance with the method of manufacturing an electrostatic ultrasonic transducer comprising the above processes, a screen printing plate and a liquid oscillation film holding part forming member are set on a surface of the conductive plate provided with the through holes, the screen printing plate being formed from a mask member for forming the oscillation film holding part forming member, a squeegee is moved simultaneously with application of the oscillation film holding part forming member to a part without the mask member after setting the screen printing plate and the liquid oscillation film holding part forming member on a surface of the conductive plate provided with the through holes and the screen printing plate is removed to dry the oscillation film holding part forming member left on the surface of the conductive plate after applying the oscillation film holding part forming member to a part coated with no the mask member. Accordingly, processes after the metal electroforming process, the processes having been required, can be made unnecessary. Moreover, a process such as development performed in a photolithography method is also not required at all. This allows the manufacturing process to be greatly shortened and manufacturing cost to be extremely reduced.

An ultra directional acoustic system in accordance with an aspect of the invention is an ultra directional acoustic system for reproducing a sound signal supplied from an acoustic source to form a virtual sound source in the vicinity of a sound wave reflection surface such as a screen by means of ultrasonic speakers comprising: an ultrasonic speaker for reproducing a signal in a middle and high sound range among sound signals supplied from the acoustic source; and a low-sound reproducing speaker for reproducing a sound in a low sound range among the sound signals supplied from the acoustic source, wherein each of the ultrasonic speakers includes an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a".

In accordance with the ultra directional acoustic system having such a structure, used is an ultrasonic speaker comprising an electrostatic ultrasonic transducer in which a value "a" of one side amplitude of the film oscillation is obtained by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ (W/m$^2$), ρo is the density of the air, the density of the air being 1.2 (kg/m$^3$) and c denotes the sound speed in the air, the sound speed in the air being around 340 (m/S), when it is assumed that the desired sound pressure outputted from the electrostatic ultrasonic transducer is P (dB), the driving frequency is f (Hz) and a value of one side amplitude of the film oscillation of the oscillation film, which is being driven, is "a" (m) and a height of a step part provided in an outer circumference of the through hole on the respective oscillation film sides of the pair of fixed electrodes, the step part being an oscillation film holding part, is set at a value exceeding and close to the one side amplitude value "a" (at least within a range that the oscillation film does not contact with an electrode due to oscillation). The ultrasonic speaker is used to reproduce a signal in a middle and high sound range among sound signals supplied from the acoustic source. A sound in a low sound range among the sound signals supplied from the acoustic source is reproduced by means of a low-sound reproducing speaker.

Accordingly, a sound in a middle and high sound range can be reproduced with a sufficient sound pressure and a wide band characteristic so as to be generated from a virtual sound source formed in the vicinity of a sound wave reflection surface such as a screen. Furthermore, a sound in a low sound range is directly outputted from a low-sound reproducing speaker provided in the acoustic system, so that a low-sound range can be reinforced, and thereby, a sound environment with high sense of presence can be created.

A display device in accordance with an aspect of the invention is a display device comprising: an ultrasonic speaker for reproducing a signal sound in an audible frequency band from a sound signal supplied from an acoustic source; and a projection optical system for projecting an image on a projection surface, wherein the ultrasonic speaker includes an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula: $a=(1/\pi f)\sqrt{\{(I_o \cdot 10^{P/10})/2\rho_o c\}}$ wherein Io denotes the reference acoustic intensity, the reference acoustic intensity being $0.96\times10^{-12}$ ($W/m^2$), $\rho_o$ is the density of the air, the density of the air being 1.2 ($kg/m^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a".

In accordance with the display device having such a structure, used is an ultrasonic speaker comprising an electrostatic ultrasonic transducer in which a value "a" of one side amplitude of the film oscillation is obtained by the following formula: $a=(1/\pi f)\sqrt{\{(I_o \cdot 10^{P/10})/2\rho_o c\}}$ wherein $I_o$ denotes the reference acoustic intensity, the reference acoustic intensity being $0.96\times10^{-12}$ ($W/m^2$), $\rho_o$ is the density of the air, the density of the air being 1.2 ($kg/m^3$) and c denotes the sound speed in the air, the sound speed in the air being around 340 (m/S), when it is assumed that the desired sound pressure outputted from the electrostatic ultrasonic transducer is P (dB), the driving frequency is f (Hz) and a value of one side amplitude of the film oscillation of the oscillation film, which is being driven, is "a" (m) and a height of a step part provided in an outer circumference of the through hole on the respective oscillation film sides of the pair of fixed electrodes, the step part being an oscillation film holding part, is set at a value exceeding and close to the one side amplitude value "a" (at least within a range that the oscillation film does not contact with an electrode due to oscillation). The ultrasonic speaker is used to reproduce a sound signal supplied from the acoustic source.

Accordingly, an acoustic signal can be reproduced with a sufficient sound pressure and a wide band characteristic so as to be generated from a virtual sound source formed in the vicinity of a sound wave reflection surface such as a screen. This allows a reproduction range to be easily controlled.

BRIEF DESCRIPTION OF THE DRAWINGS

The invention will be described with reference to the accompanying drawings, wherein like numbers reference like elements.

FIG. 3 is a conceptual view for obtaining a wave equation.

FIG. 4 is a conceptual view for obtaining acoustic intensity.

FIG. 5 shows examples of calculation of film amplitude.

DESCRIPTION OF EXEMPLARY EMBODIMENTS

Embodiments of the invention will be described in detail, made reference to the drawings.

Outline of the Invention

Figure 1A:
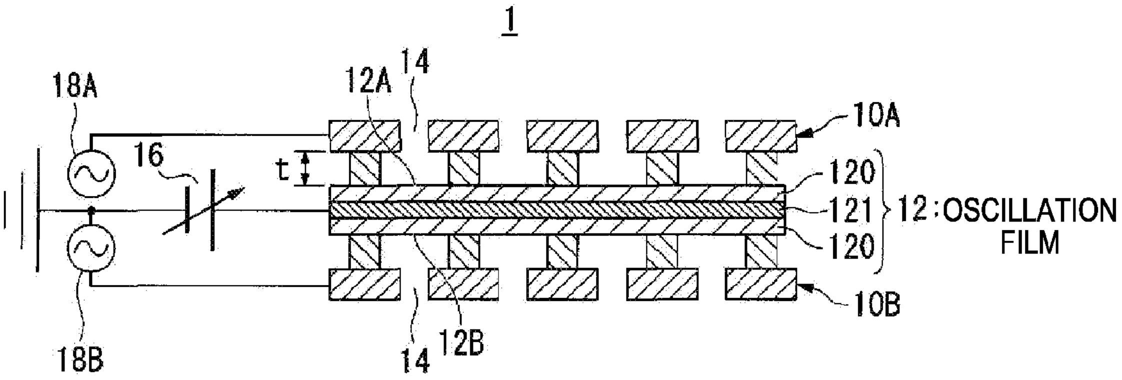
FIGS. 1A and 1B schematically show a structure of an ultrasonic transducer to which a designing method in accordance with an embodiment of the invention is applied
Figure 1B:
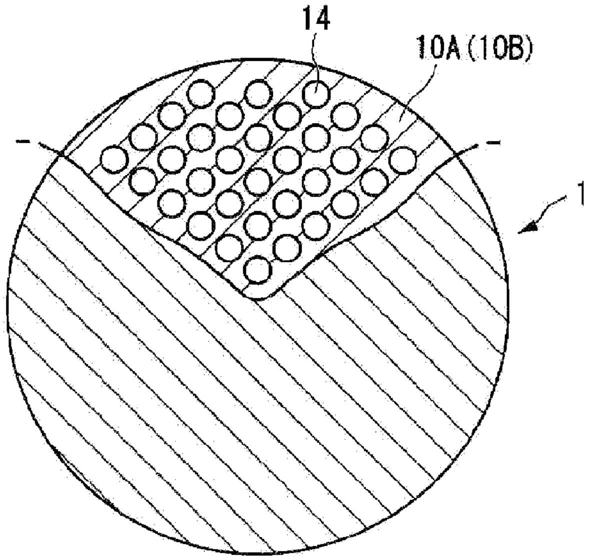

In embodiments of the invention, a formula for setting the height "t" of a step of a hole with the step (corresponding to an oscillation film holding part) at the optimum height is fixed in a push-pull type electrostatic ultrasonic transducer shown in FIGS. 1A and 1B. In the formula, a one side amplitude value "a" (m) of a film oscillation is obtained by means of the following formula:

$$a=1/\pi f\sqrt{1_0 10^{P/10}/2\rho_o c}$$

wherein P (dB) denotes desired sound pressure, f (Hz) denotes driving frequency, Io denotes reference acoustic intensity, which is $0.96\times10^{-12}$ ($W/m^2$), $\rho_o$ denotes density of the air, which is 1.2 ($kg/m^3$) and c denotes sound speed in the air, which is around 340 (m/s).

A value exceeding the one side amplitude value "a" of a film oscillation, which is calculated in the formula, the value being as close as possible to the amplitude value "a" (at least within a range that the oscillation film does not contact with an electrode due to oscillation), is designed as the height "t" of a step of a hole with the step of the fixed electrode to form an ultrasonic transducer. The ultrasonic transducer in which the fixed electrode is designed in the above method is used in an ultrasonic speaker.

Description of Example of the Ultrasonic Transducer to Which the Designing Method in Accordance with the Invention is Applied FIGS. 1A and 1B schematically show a structure of a push-pull type electrostatic transducer to which the designing method in accordance with an embodiment of the invention is applied.

In FIG. 1A, a push-pull type electrostatic transducer 1 to which the designing method in accordance with an embodiment of the invention is applied comprises a pair of fixed electrodes 10A and 10B including a conductive member formed from a conductive material for functioning as an electrode, an oscillation film 12 held between the pair of fixed electrodes and including an electrode layer (a conductive layer) 121 and a member (not shown) holding the pair of fixed electrodes 10A and 10B and the oscillation film.

The oscillation film 12 is formed from an insulator 120 and includes the electrode layer 12 formed from a conductive material. Alternating current bias voltage with single polarity (which may be any one of positive and negative polarities) is to be applied to the electrode layer 121 from an alternating current bias power source 16. Further, between the pair of fixed electrodes 10A and 10B, arranged to be applied are alternating current signals 18A and 18B, which are outputted from the signal source 18 and whose phase are reversed to each other, superimposed on the alternating current bias voltage.

The pair of fixed electrodes 10A and 10B are provide with plural through holes (through holes with a step) 14, which are equal in number between the electrodes, so that the through holes would be opposed to each other with respect to the oscillation film 12. It is arranged that the alternating current signals 18A and 18B, which are outputted from the signal source 18 and whose phases are reversed to each other, be applied between the conductive members of the pair of fixed electrodes 10A and 10B from the signal source 18. The fixed electrode 10A and the electrode layer 121 as well as the fixed electrode 10B and the electrode layer 121 form a condenser.

In the above structure, in the ultrasonic transducer 1, the alternating current bias voltage with single polarity (which is positive polarity in the first embodiment) is applied to the electrode layer 121 of the oscillation film 12 from an alternating current bias power source 16 with the alternating current signals 18A and 18B, which are outputted from the signal source 18 and whose phases are reversed to each other, being further applied to.

On the other hand, an alternating current signal is applied from the signal source 18 to the pair of the fixed electrodes 10A and 10B. As a result, positive voltage is applied to the fixed electrode 10A in a positive half cycle of the alternating current 18A outputted from the signal source 18, so that electrostatic force of repulsion operates on a surface part 12A, which is not held by means of the fixed electrodes of the oscillation film 12. The surface part 12A is pulled downward in FIG. 1A.

At that time, the alternating current signal 18B is in a negative cycle. Accordingly, application of negative voltage on the opposite fixed electrode 10B causes electrostatic attraction operating on a back surface part 12B, which is a back surface side of the surface part 12A of the oscillation film 12, so that the back surface part 12B is further pulled downward in FIG. 1A.

Accordingly, the film part, which is not held by means of the pair of fixed electrodes 10A and 10B of the oscillation film 12, receives the electrostatic repulsive force and the electrostatic repulsive force in the same direction. This is true of a negative half cycle of the alternating current signal outputted from the signal source 18. The electrostatic attractive force operates on the surface part 12A of the oscillation film 12 upward in FIG. 1A while the electrostatic repulsive force operates on the back surface part 12B downward in FIG. 1A. The film part, which is not held by means of the pair of fixed electrodes 10A and 10B of the oscillation film 12, thus receives the electrostatic repulsive force and the electrostatic repulsive force in the same direction. As described above, the oscillation film 12 receives the electrostatic repulsive force and the electrostatic repulsive force in the same direction while the direction that the electrostatic force operates alternately varies in accordance with the change in polarity of the alternating signal. This allows large film oscillation, namely, an acoustic signal at an enough sound level to obtain the parametric array effect to be generated.

The ultrasonic transducer 1 is called a push-pull type since the oscillation film 12 receives force from the pair of fixed electrodes 10A and 10B to oscillate, as described above. The push-pull type ultrasonic transducer 1 is capable of simultaneously achieving the wide band and the high sound pressure, differently from a pull-type electrostatic ultrasonic transducer in which the electrostatic attractive force only operates on the oscillation film.

In the ultrasonic transducer shown in FIGS. 1A and 1B, the fixed electrodes 10A and 10B may be formed from a single body such as SUS, brass, iron and nickel, for example, so long as materials of the fixed electrodes 10A and 10B have conductivity. Further, a plating process with nickel, gold, silver or copper may be performed after a desired drilling process is carried out for a glass epoxy board or a paper phenol board, which is generally used for a circuit substrate, since reducing in weight is required. In this case, performing the plating process on the both surfaces of a boarding is effective for the purpose of preventing a warp after shaping the substrate. In view of insulation, however, some insulating process is preferably carried out on the oscillation film side of the respective fixed electrodes. For example, formed is a convex insulated by means of a liquid solder resist, a photosensitive film, a photosensitive coating material, a nonconductive coating or an electrodeposition material.

Figure 2:
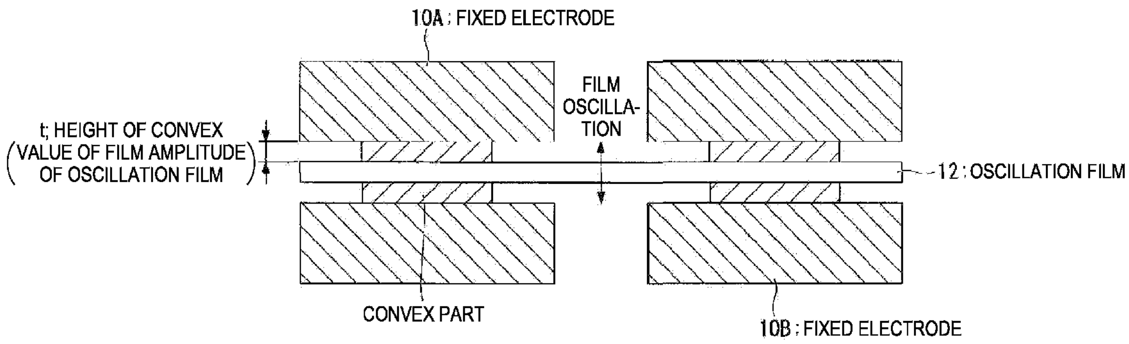
FIG. 2 is an enlarged view of a convex of a fixed electrode of the electrostatic ultrasonic transducer shown in FIGS. 1A and 1B.

FIG. 2 is an enlarged view of the convex parts of the fixed electrodes of the electrostatic ultrasonic transducer shown in FIGS. 1A and 1B. As shown in FIG. 2, the oscillation film 12 is likely to contact with the fixed electrodes when the height "t" of a step of the convex part is not equal to or more than the amplitude of the oscillation film 12. Accordingly, it can be seen that the amplitude of the oscillation film 12 can be calculated for setting the height "t" of the convex part (the height of a step of a hall with the step). In other words, setting the height "t" of the convex part (the height of a step of a hall with the step) at a value close to the amplitude of the film (at least within a range that the oscillation film is not contact with the electrodes due to the film oscillation) is the optimum design, which allows the desired sound pressure to be generated with less energy. Reduction in pressure (reduction in power) can be thus achieved. A method of calculating the amplitude of the oscillation film 12 will be described hereinafter.

Calculation of Amplitude of Film (Calculation of Wave Equation)

Obtaining of a wave equation (relating the in-air acoustics) is carried out as the first process for calculating amplitude of the film. A wave equation relating the acoustics is obtained since the equation is important in understanding the definition of an important variable, which is often used hereinafter, although the amplitude of the film is not directly related to the sound pressure (the source: Pages 158 to 159 of "ONKYOU KOUGAKU GENRON (Principal of Acoustic Engineering), the first volume" by Takeshi Ito, CORONA PUBLISHING CO., LTD.).

As show in FIG. 3, the volume of a gas between a plane "x" and a plane "x+δx" becomes to the volume between a plane (x+∈) and a plane (x+∈+δx+δ∈) at a time "t" after a change. Accordingly, the distance between the two planes sandwiching the volume varies from "δx" to "δx+δ∈". Accordingly, "δ∈" can be considered to be $$\delta\in=a\delta/ax\cdot\delta x \quad (1),$$

and therefore, variation in thickness of the layer is $$(1+a\in/ax)\cdot\in x.$$

The expansion rate (non-dimensional quantity) of the above part is $$\Delta=a\in/ax \quad (2).$$

The condensation rate (non-dimensional quantity) is $$s=-\Delta=-a\in/ax \quad (3).$$

Then, the pressure can be expressed by the condensation rate "s", that is, a member "∈" for the sake of convenience as follows, using the expression of $$\delta p=-k\cdot\delta v/v=-k\Delta=-ks(Pa) \quad (4):$$

$$P=P_0+\delta P=P_0+ks(Pa) \quad (5).$$

An equation of motion for the mass of a gas between the plane "x" and the plane "x+δx" is then calculated. An equation of force operating on the unit area of the planes is expressed by $$\rho_0\delta x\cdot a^2\in/at^2=-\delta P(Pa) \quad (6)$$

wherein "δp" is the quantity of increase in pressure at the front of the planes. In accordance with the equations (6), (5) and (3), $$a^2\in/at^2=c^2\cdot a^2\in/ax^2,$$

$$c=\sqrt{k}/\rho_0$$

$$(m/s) \quad (7)$$

The equation (7) is the plane wave equation relating the acoustics.

Calculation of Amplitude of Oscillation Film (Obtaining Acoustic Intensity of Plane Wave)

As the second process for calculating the amplitude of the oscillation film, calculated is an energy flow passing through the unit area of a surface of the crest of the plane wave. For the purpose of the above, assumed is a case that the air in a cylinder having the area in section "S" is oscillated by means of a piston provided on one end of the cylinder as shown in FIG. 4. The acoustic intensity is thus obtained.

Movement of the piston in FIG. 4 is expressed by the equation (8):

$$\in_0=a\cos\omega t \quad (8).$$

The air on the positive side of x is considered to vary in phase as follows:

$$\in=a\cos\omega(t-x/c) \quad (9).$$

In this case, the workload of the piston for the air per a second is $$W=Fx/t=F\cdot dx/dt=PS\cdot dx/dt=(P_0+ks)s\cdot dx/dt=-P_0\omega Sa\sin\omega t+k\omega^2a^2/c\cdot S\sin^2\omega t(W) \quad (10).$$

In accordance with time-average of the above, $$W=\tfrac{1}{2}k\omega^2a^2 1/c\ S=\tfrac{1}{2}P_0cS\omega\omega^2a^2(W) \quad (11)$$

wherein the first member of the expression (10) is removed. The value is equal to the energy or a sound wave included in the capacity "cS" and the energy is radiated into the air from the piston every second. The sound wave, however, is transmitted for a distance "c" per a second, and thus, a surface of the crest of the wave advances the distance c per a second. The static air in the capacity "cS" per a second is newly oscillated. The surface of the crest of the sound wave transmits the energy at a rate expressed by the equation (11). This is called a energy flow. Accordingly, the energy transmitted by the surface of the crest of the wave per a unit area per a second is expressed by:

$$W=\tfrac{1}{2}P_0c\omega^2a^2(W/m^2) \quad (12),$$

which is called power density or acoustic intensity in acoustics and which is denoted by "I". On the other hand, the sound pressure P (dB) and the acoustic intensity I ($W/m^3$) are related by means as the following equation:

$$P=10\log I/I_0 \quad (13)$$

wherein $I_0$ denotes reference acoustic intensity, which is $0.96\times10^{-12}$ ($W/m^2$).

On the basis of the equations (12) and (13), expressed is the value "a" of the film amplitude by the following equation.

$$a=1/\pi f\sqrt{I_0 10^{P/10}/2\rho_o c} \quad (14).$$

The equation (14) is a formula for calculating the film amplitude necessary to designing.

Cases that the sound pressure "P" in the equation (14) is 130, 140 and 150 (dB) are assumed since the necessary sound pressure is 130 dB or more in the case of an ultrasonic speaker. When the frequency of the carrier ultrasonic wave is 40, 50 or 60 (kHz), the amplitude value "a" is as shown in FIG. 5.

For example, 2.18 μm of film amplitude is required to obtain 140 (dB) of sound pressure with driving at 50 kHz. Accordingly, the height "t" of the convex part of the fixed electrode is preferably set at 2.18 μm or more, particularly, at a value as close to 2.18 μm as possible in order to prevent the film oscillation from contacting with the fixed electrode and to make operation of the electrostatic force efficient.

Description of Example of Structure of Ultrasonic Speaker

Figure 6:
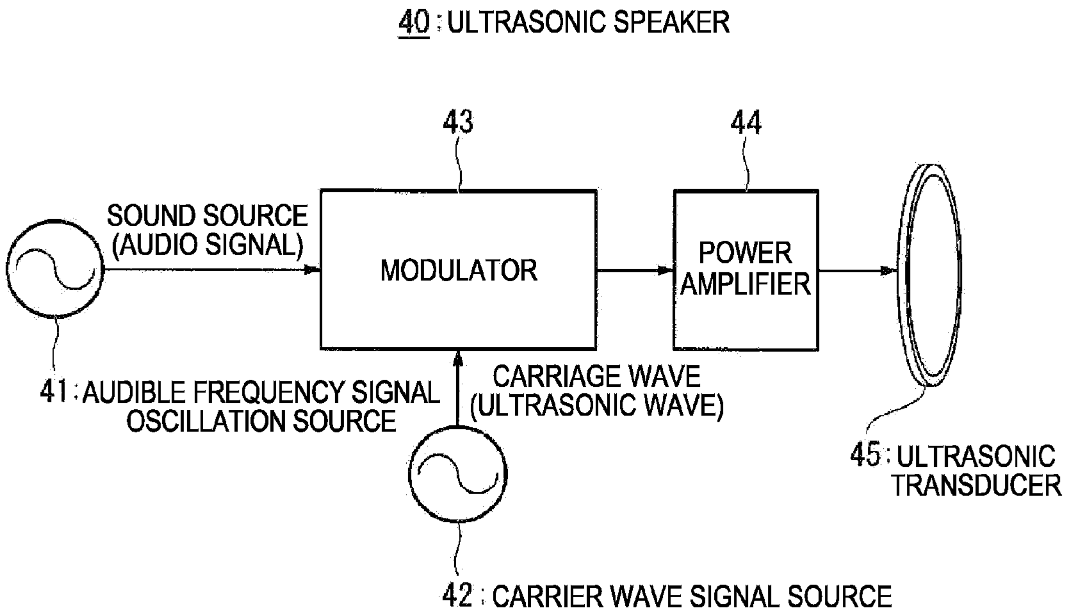
FIG. 6 illustrates an example of a structure of an ultrasonic speaker.
Figure 7:
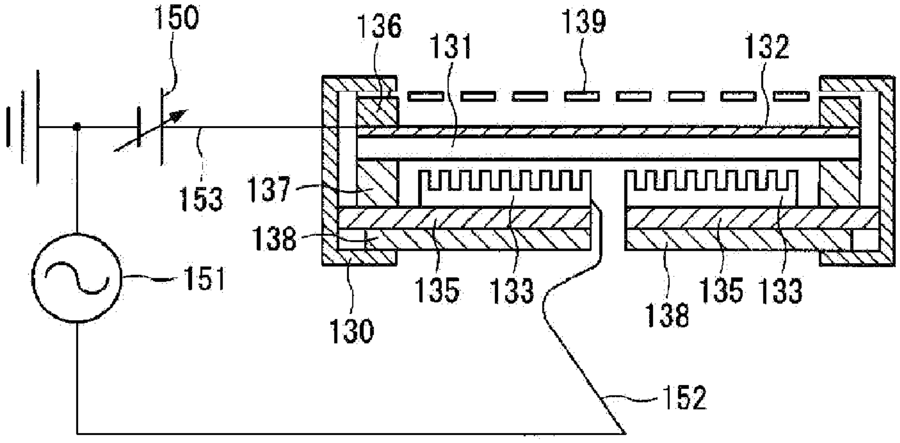
FIG. 7 illustrates an example of a structure of a pull type electrostatic ultrasonic transducer.

FIG. 6 shows an example of a typical structure of an ultrasonic speaker using the ultrasonic transducer formed in the above-mentioned designing method. In the ultrasonic speaker, an ultrasonic wave called a carrier wave is AM-modulated with an audio signal (an audible area signal) and the AM-modulated ultrasonic wave is radiated into the air to self-reproduce an original audio signal in the air due to non-linearity of the air.

That is to say, in a process of transmission of the modulated ultrasonic wave, remarkably appear a part dense with the air and a thin part since the sound wave is a compressional wave transmitted with the air being used as a medium. The speed of sound is fast in the dense part while it is slow in the thin part, so that distortion appears in the modulated wave per se. This results in separation of the waveform into a carrier wave (an ultrasonic wave) and an audible wave (the original audio signal). The human beings can only hear the audible sound (the original audio signal), which is 20 kHz or less. This is a principle used in the ultrasonic speaker and generally called a parametric array effect In FIG. 6, an ultrasonic speaker 40 comprises an audible frequency wave signal oscillating source (an audio signal source) 41 for generating a signal wave in a frequency band of an audible wave, a carrier wave signal source 42 for generating and outputting a carrier wave in a frequency band of an ultrasonic wave, a modulator 43, a power amplifier 44 and an ultrasonic transducer 45. In the above context, the "audible frequency band" means a frequency band equal to or less than 20 kHz while the "ultrasonic frequency band" means a frequency band exceeding 20 kHz in this embodiment.

The modulator 43 modulates a carrier wave outputted from the carrier wave signal source 42 by means of a signal wave in the frequency band of the audible wave outputted from the audible frequency wave signal oscillating source 41 to supply an ultrasonic transducer 45 with the modulated wave through the power amplifier 44.

In the above structure, a carrier wave outputted from the carrier wave signal source 42 is modulated with the audio signal wave outputted from the audible frequency wave signal oscillating source 41 by means of the modulator 43 to drive the ultrasonic transducer 45 in accordance with a modulating signal amplified in the power amplifier 44. As a result, the modulating signal is converted into a sound wave at a limited oscillation level by means of the ultrasonic transducer 45 and the sound wave is radiated into the medium (into the air) to self-reproduce a signal sound in the original audible frequency band owing to the non-linear effect of the medium (the air). That is to say, the sound wave is a compressional wave transmitted with the air being used as a medium, and therefore, a part dense with the air and a thin part remarkably appear in a process of transmission of the modulated ultrasonic wave. The speed of sound is fast in the dense part while it is slow in the thin part, so that distortion appears in the modulated wave per se. This results in separation to a carrier wave (an ultrasonic wave frequency band) to reproduce a signal wave (signal sound) in the frequency band of the audible wave.

As described above, in the push-pull type electrostatic ultrasonic transducer shown in FIG. 1, specifying the film amplitude with the driving frequency and the desired sound pressure being given allows an excellent surface shape of a defining electrode (an oscillation film holding part in the convex shape) to be quantitatively designed. Up to now, required has been high driving alternating current voltage since the height of the convex part of the fixed electrode is 10 to 20 μm. In the case that the designing method in accordance with the invention is used, however, the film amplitude is determined in accordance with determination of the desired sound pressure and the driving frequency. On the basis of the values of the determined sound pressure and driving frequency, designed can be the optimum height "t" of the convex part, so that an efficient structure can be achieved. This allows the desired sound pressure with less voltage. In other words, the sound pressure same as that of the related art can be generated with less energy, so that reduction in voltage (reduction in power) can be achieved.

Description of Method of Manufacturing Fixed Electrode of Electrostatic Ultrasonic Transducer in Accordance with the Invention Now, described will be a method of manufacturing a fixed electrode part of a push-pull type electrostatic ultrasonic transducer in accordance with an embodiment of the invention.

Figure 15A:
FIGS. 15A to 15G illustrate manufacturing processes showing a usual method of manufacturing an ultrasonic transducer.
Figure 15B:
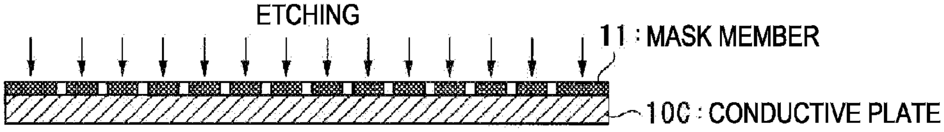

First, described will be a manufacturing process in a case of manufacturing a fixed electrode part of an ultrasonic transducer by photolithography in a usual method, made reference to FIGS. 15A to 15G. In FIGS. 15A and 15B, a conductive plate (for which copper or stainless is usually used, but copper is suitable for nickel electroforming) 10C is covered with a mask member 11 provided with a pattern of plural through holes to form through holes 14 in the conductive plate 10C in an etching process (FIGS. 15A and 15B).

Figure 15C:
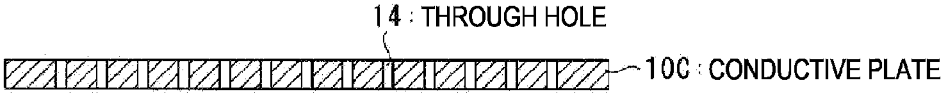
Figure 15D:
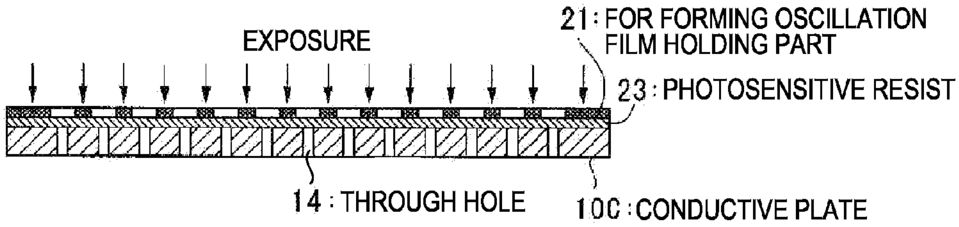

The mask member 11 is then stripped after the through holes 14 are formed in the conductive plate 10C to obtain the conductive plate 10C provided with the through holes 14 (FIG. 15C).

A caliber of the through hole 14 formed in the conductive plate 10C by etching has a limitation due to the thickness of the conductive plate 10C. In the case of 0.25 mm of minimum caliber of the through hole 14 used in the ultrasonic transducer in accordance with the embodiment of the invention, for example, the thickness of the board in which the through hole 14 with the above minimum caliber can be formed is defined to be 0.25 mm or less. Accordingly, when a fixed electrode whose thickness is 0.25 mm or more is required, a few sheets of metal plate, which is 0.25 mm in thickness and which is provided with the through holes 14 formed by etching, are prepared in advance and the required number of sheets are piled and metal-bonded by thermocompression bonding or diffusion bonding to be laminated for forming a fixed electrode having the desired thickness.

Figure 15E:
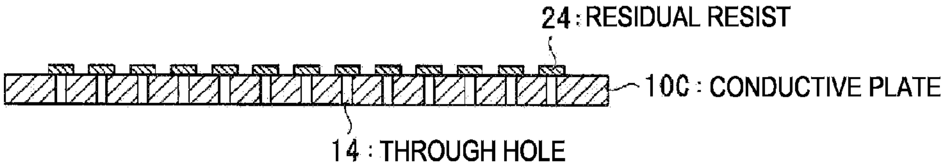

Next, a photosensitive resist (a coating in the case of liquid and a laminate in the case of a film) 23 is added to the conductive plate 10C provided with the through holes 14 (or a laminated conductive plate) as a pre-process for the purpose of forming an oscillation film holding part (a part with difference in level) forming the fixed electrode. After the above, exposure is carried out with the mask member 21 for forming the oscillation film holding part (FIG. 15E).

For the photosensitive resist 23, generally used is a liquid resist or a dry film, which is used for forming a temporary intermediate structural body by etching, plating or such. In the structure according to the invention, however, using a dry film is more effective since the present structure is aimed at sealing the through holes 14.

After an unnecessary resist is removed in developing, only exposed is the surface of the conductive plate 10C at a part for forming the oscillation film holding part (a step part) of the fixed electrode (FIG. 15).

Figure 15F:
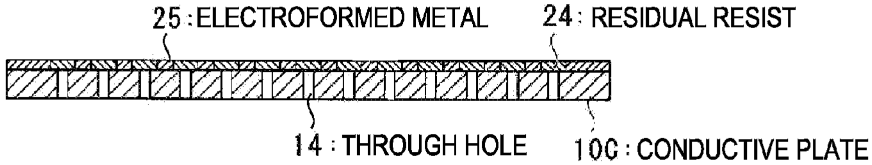

Then, metal (nickel, for example) is laminated to the desired height by electroforming on the exposed surface of the conductive plate 10C (FIG. 15F). In this case, the height of the oscillation film holding part of the fixed electrode, namely, the step part provided in the outer circumference of the through hole is set as follows.

That is to say, when it is assumed that the desired sound pressure outputted from the electrostatic ultrasonic transducer is "P" (dB), the driving frequency is "f" (Hz) and a value of one side amplitude of the film oscillation of the oscillation film, which is being driven, is "a" (m), the value "a" of one side amplitude of the film oscillation is obtained by the following formula:

$$a=(1/\pi f)\sqrt{\{(I_o\cdot 10^{P/10})/2\rho_o c\}}$$

wherein $I_o$ denotes the reference acoustic intensity, which is $0.96\times10^{-12}$ (W/m$^2$), $\rho_o$ is the density of the air, which is 1.2 (kg/m$^3$) and c denotes the sound speed in the air, which is around 340 (m/S). The height of the step part of the oscillation film holding part provided in the outer circumference of the through hole on the respective oscillation film sides of the pair of fixed electrodes is set at a value exceeding and close to the one side amplitude value "a" (at lease within a range that the oscillation film is not in contact with the electrode due to film oscillation).

Figure 15G:
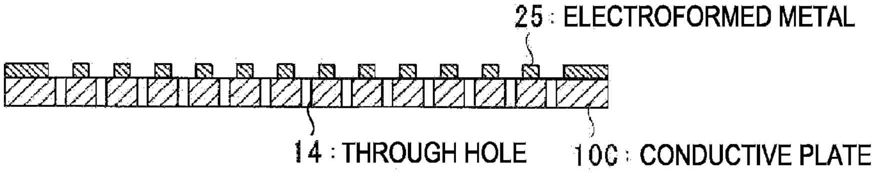

Stripping a remaining resist 24 after the electroforming process is completed allows the desired fixed electrode to be obtained (FIG. 15G).

Problems of the fixed electrode, which are caused when the fixed electrode is manufactured in the above-mentioned usual manufacturing process, are described below.

(1) A thin film cannot be used for the oscillation film.

In the case of manufacturing the fixed electrode in the above-mentioned usual manufacturing process, that is, in the case of forming the oscillation film holding part of the fixed electrode from a conductive material, the maximum clearance between a metal deposition layer (=a conductive layer) of the oscillation film and the fixed electrode is equal to the thickness of the insulating layer of the oscillation film.

The insulating layer of the oscillation electrode film used in the ultrasonic transducer in accordance with the embodiment of the invention is made of polyethylene terephthalate (PET), polyethylene sulfide (PPS), polypropylene (PP), polyimide (PI) or the like.

The breakdown strength of the respective materials is as follows:

PET, PPS and PI: 200 V/μm

PP: 300 V/μm.

The voltage applied to the present transducer is hundreds V to several kV in the both cases of the fixed electrode and the oscillation electrode film.

Accordingly, when PET is used for the insulating layer of the oscillation film in the usual structure, for example, at least 10 μm in film thickness is required to apply 2 kV of voltage, so that the film thinner than the above cannot be used for the oscillation film.

(2) Breakdown easily occurs.

An edge part of the fixed electrode formed in the etching process is extremely sharp. Further, a several to tens micrometers of burr occurs at a place where an additional process (a mechanical process) is carried out. Moreover, the metal having undergone the etching process is easily warped and it has been confirmed that at least a tens μm of warp is left even in the case that the thermocompression bonding or diffusion bonding is performed.

Figure 16:
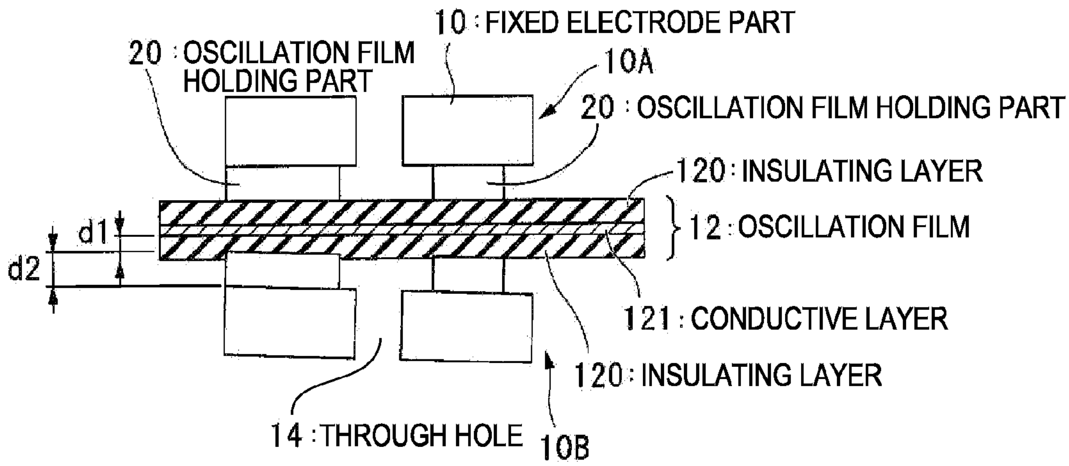
FIG. 16 shows a structural problem of an ultrasonic transducer in the usual manufacturing method.

As described above, holding certainly the oscillation electrode film with the fixed electrode having a warp causes the edge part of an oscillation film holding part 20 of the fixed electrode to cut into the insulating layer 120 of the oscillation film 12, as shown in FIG. 16.

The oscillation holding part 20 is formed from a conductive material in the usual structure. Accordingly, the minimum gap between an electrode layer 121 of the oscillation film 12 and the conductive part of the fixed electrode is d1 in FIG. 16. The gap is reduced by the quantity that the edge part cuts into the insulating layer 120, so that the breakdown strength is reduced.

In the case that the insulating layer 120 is made of PET, for example, it is difficult to apply 200 V or more of voltage when d1 is as small as around 1 μm.

(3) Large electrostatic capacity consumes unnecessary energy.

Electric power to be applied is determined in accordance with the electrostatic capacity. The narrower the gap between the electrode layer 121 of the oscillation film 12 and the fixed electrode is, that is, the thinner the insulating layer 120 of the oscillation electrode film is, the larger the electrostatic capacity is, so that the electric power to be applied is increased.

On the other hand, the electrostatic force operating on the oscillation film 12 most influencing the main characteristic (=the sound pressure) of the ultrasonic transducer is determined on the basis of the area of a metal surface of the fixed electrode, the metal surface being exposed as the oscillation film holding part, and a difference in level of the oscillation film holding part (=a gap between the conductive body and the oscillation film).

Accordingly, using the oscillation film having a thin insulating layer increases the electrostatic force as well as the electrostatic capacity greatly. This deteriorates energy efficiency.

As described above, manufacturing the fixed electrode of the ultrasonic transducer in the usual manufacturing process has the problems that (1) a thin film cannot be used for the oscillation film, (2) breakdown easily occurs between the oscillation film of the fixed electrode and the conductive layer and (3) the electrostatic capacity generated between the conductive layer of the oscillation film and the fixed electrode is large, so that unnecessary energy is consumed.

The method of manufacturing the ultrasonic transducer, which is described below, can solve those problems.s First Embodiment of the Method of Manufacturing the Fixed Electrode of the Electrostatic Ultrasonic Transducer in Accordance with the Invention (the Photolithography Method)

FIGS. 8A to 8E show the first embodiment of the method of manufacturing the fixed electrode of the electrostatic ultrasonic transducer in accordance with the invention.

Figure 8A:
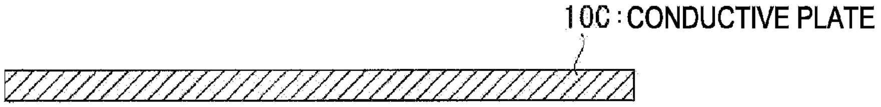
FIGS. 8A to 8E illustrate a first embodiment of a method of manufacturing an ultrasonic transducer.
Figure 8B:
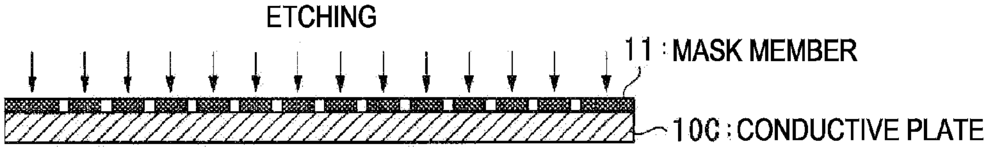

In FIGS. 8A and 8B, a conductive plate (for which copper or stainless is usually used, but copper is suitable for nickel electroforming) 10C is covered with a mask member 11 provided with a pattern of plural through holes to form through holes 14 in the conductive plate 10C in an etching process (FIGS. 8A and 8B).

Figure 8C:
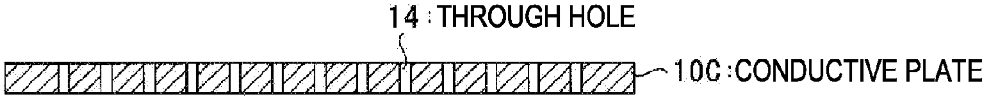

The mask member 11 is then stripped after the through holes 14 are formed in the conductive plate 10C to obtain the conductive plate 10C provided with the through holes 14 (FIG. 8C). Following to the above, the conductive plate 10C is laminated to achieve desired thickness. The conductive plate 10C is not necessary to be laminated, of course, when the desired thickness can be achieved by means of one sheet of conductive plate 10C.

Figure 8D:
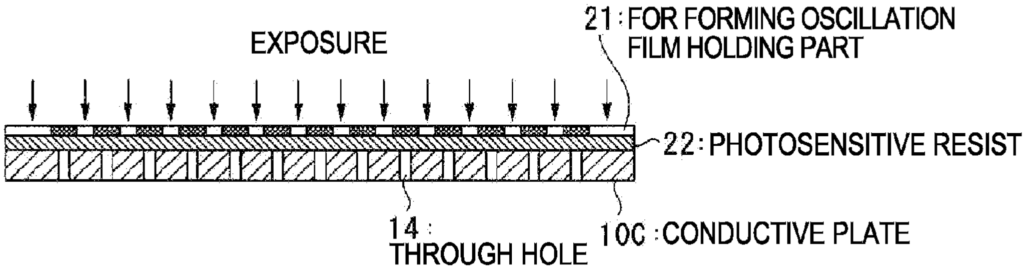

Next, a photosensitive resist (obtained by a coating process in the case of liquid and a laminating process in the case of a film) 22 is added to the conductive plate 10C provided with the through holes 14 (or a laminated conductive plate) for the purpose of forming a difference in level, the difference forming an oscillation film holding part. After the above, exposure is carried out with the mask member 21 for forming the oscillation film holding part (FIG. 8D).

The photosensitive resist 22 used as a material for forming the oscillation film holding part in the embodiment should be able to form the oscillation film holding part permanently and should be non-conductive. As a material, considered to be effective is a photosensitive polyimide coating material (which is a photosensitive coating material used in manufacturing a semiconductor and which uses a metal plate coated by spin-coating) in the case of a liquid and a photosensitive solder resist film or a photosensitive polyimide film, which is used for a package of a circuit board in the case of a film.

Figure 8E:
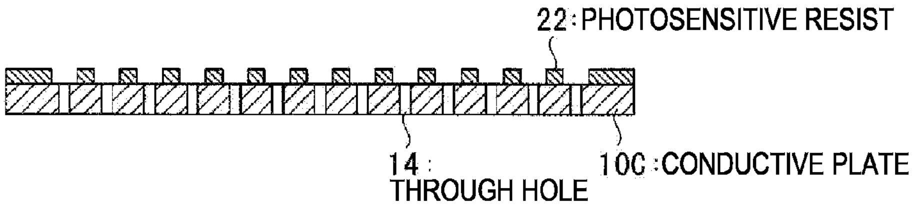

After the mask member 21 for forming the oscillation film holding part is stripped and an unnecessary part of the photosensitive resist 22 is removed in developing, the surface of the conductive plate 10C, which forms the fixed electrode part, is only exposed and the non-conductive photosensitive resist 22 is left on the other part to form the desired fixed electrode (FIG. 8E).

In the method of manufacturing the fixed electrode of the ultrasonic transducer, the method comprising the above processes, the oscillation film holding part of the fixed electrode for holding the oscillation film is formed from an insulating material by the photolithography method. Accordingly, the usually necessary processes following to the metal electroforming process can be omitted, so that the manufacturing process can be shortened and the manufacturing cost can be reduced. Further, improvement in environment can be expected since a solvent (mainly a strong alkaline solvent) used in a process of stripping the remaining resist is not necessary.

Second Embodiment of the Method of Manufacturing the Fixed Electrode of the Electrostatic Ultrasonic Transducer in Accordance with the Invention (the Screen Printing Method)

FIGS. 9A to 9E show the second embodiment of the method (process) of manufacturing the fixed electrode of the electrostatic ultrasonic transducer in accordance with the invention.

Figure 9A:
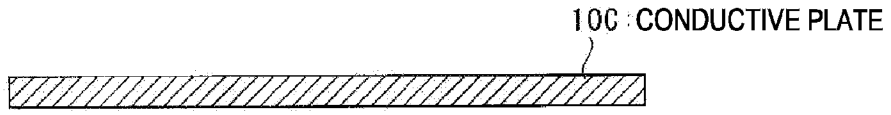
FIGS. 9A to 9E illustrate a second embodiment of a method of manufacturing an ultrasonic transducer.
Figure 9B:
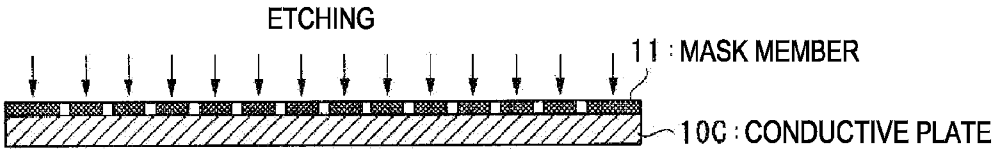

In FIGS. 9A and 9B, a conductive plate (for which copper or stainless is usually used, but copper is suitable for nickel electroforming) 10C is covered with a mask member 11 provided with a pattern of plural through holes to form through holes 14 in the conductive plate 10C in an etching process (FIGS. 9A and 9B).

Figure 9C:
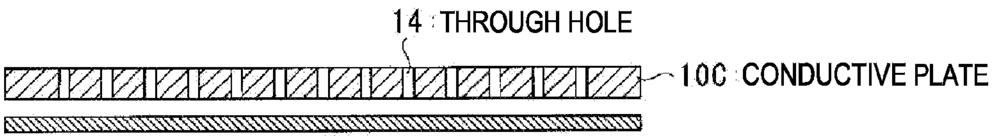

The mask member 11 is then stripped after the through holes 14 are formed in the conductive plate 10C to obtain the conductive plate 10C provided with the through holes 14 (FIG. 9C).

Following to the above, the conductive plate 10C is laminated to achieve the desired thickness. The conductive plate 10C is not necessary to be laminated, of course, when the desired thickness can be achieved by means of one sheet of conductive plate 10C.

Figure 9D:
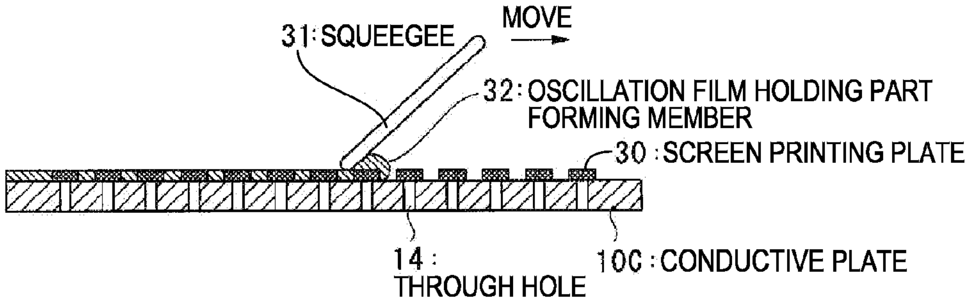

A plate for screen printing 30, which is for forming the oscillation film holding part of the fixed electrode, and a liquid material for forming the oscillation film holding part 32 are set on the conductive plate 10C provided with the through holes 14 (or a laminated conductive plate) and a squeegee 31 is moved to apply the liquid material for forming the oscillation film holding part 32 to a part of the plate for screen printing 30, which is not covered with the mask member (FIG. 9D).

Herein, an oscillation film holding part forming member 32 considered to be effective is a non-conductive material capable of permanently forming the oscillation film holding part such as a liquid solder resist for package, which is generally used for a circuit board, or a masking ink used as a resist for sandblasting, for example. Especially, a solder resist for a flexible printing board is effective for certainly holding the oscillation electrode film since it is comparatively soft (as soft as HB to 3H in hardness of a pencil).

Figure 9E:
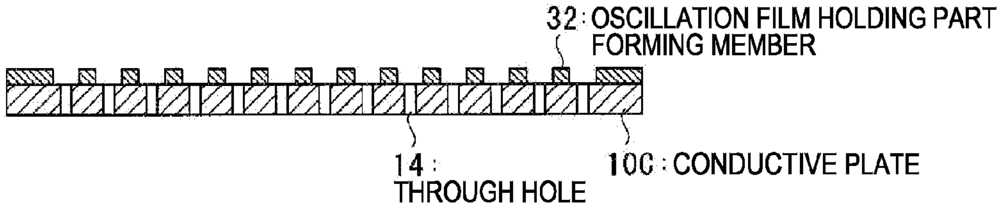

When the screen printing plate 30 is removed after completing application of the oscillation film holding part forming member 32 to a part of the screen printing plate 30 having no mask member, a non-conductive layer (=the oscillation film holding part forming member 32) is left at the oscillation film holding part on the conductive plate 10C. Drying the non-conductive layer allows a desired fixed electrode to be formed (FIG. 9E).

As described above, forming the oscillation film holding part of the fixed electrode with an insulating material by screen printing allows conventionally required processes following to the metal electroforming process to be unnecessary. Further, a developing process in the photolithography method is also not necessary at all. This allows the manufacturing process to be greatly shortened and manufacturing cost to be greatly reduced.

As another method of manufacturing ultrasonic transducers considered can be a method of forming a resist in advance so that a conductive part would be exposed only at a part to be coated and a non-conductive ink (a non-conductive coating) is spread by means of an ink-jet head to be applied or electrodeposition coating is carried out after a soak in an electrodeposition polyimide material to strip the resist after the application or the electrodeposition.

As described above, forming the oscillation film holding part of the fixed electrode of the electrostatic ultrasonic transducer from a non-conductive material (an insulating material) allows the following effects to be achieved.

(1) A range of selecting the thickness of a film for forming the oscillation film is widened.

The thickness of the insulating layer is increased by the difference in step of the oscillation film holding part of the fixed electrode, which is formed from a non-conductive material, (several μm to tens μm), so that a thin film equal to or less than 10 μm in thickness can be used at high voltage with no matter as the oscillation film.

For example, the upper limit value of the voltage to be applied is 600 V in the conventional structure of the fixed electrode (in which the whole fixed electrode is formed from a conductive material) when a 3 μm of PET film is used for an insulating layer of the oscillation electrode film. Using on-conductive material, however, allows 1 kV or more of voltage to be applied since a clearance between a surface of the fixed electrode and the conductive layer of the oscillation film is 6 μm even in the case that the difference in step of the oscillation film holding part is 3 μm, for example.

Moreover, when the difference in step of the oscillation film of the fixed electrode is 20 μm while 3 kV of voltage is applied, for example, using non-conductive material for forming the oscillation film holding part of the fixed electrode allows 1 μm of PET film (clearance: 21 μm) to be enough although 15 μm of insulating layer (PET) is necessary in the conventional structure of the fixed electrode.

(2) The insulation destruction can be prevented from occurring between the fixed electrode and the conductive layer of the oscillation film due to a damage of the oscillation film.

That is to say, in the case that the oscillation film holding part 20 of the fixed electrodes 10A and 10B are formed from a non-conducive material, the difference in step d2 (several μm to tens μm) of the oscillation film holding part 20 is added as an insulating layer, so that the minimum gap between the electrode layer 121 of the oscillation film 12 and the fixed electrode part (conductive part) 10 of the fixed electrode would be (d1+d2). This allows the breakdown strength to be certainly secured even when the edge part cuts into the insulation layer 120 of the edge part of the oscillation film 12. This causes no conventional inconvenience to occur, so that even a thin oscillation electrode film can be handled with no matter.

Furthermore, even in the case that a part of the fixed electrodes 10A or 10B completely contacts with the electrode layer 121 of the oscillation film 12 or completely breaks through the oscillation film 12 to be in contact with the fixed electrode on the opposite side, the conductive parts are not contact with each other, so that deterioration in strength of insulation and short-circuit due to structural distortion of the fixed electrode can be completely prevented.

(3) Reduction in electrostatic capacity allows energy efficiency to be improved.

Differently from a conventional case of forming the whole fixed electrode from conductive material, forming the oscillation film holding part from a non-conducting material allows only the electrostatic capacity at the conductive part of the fixed electrode (the fixed electrode 10) to be reduced without no change in electrostatic force operating on the oscillation film.

Figures 10A, 10B, 11:
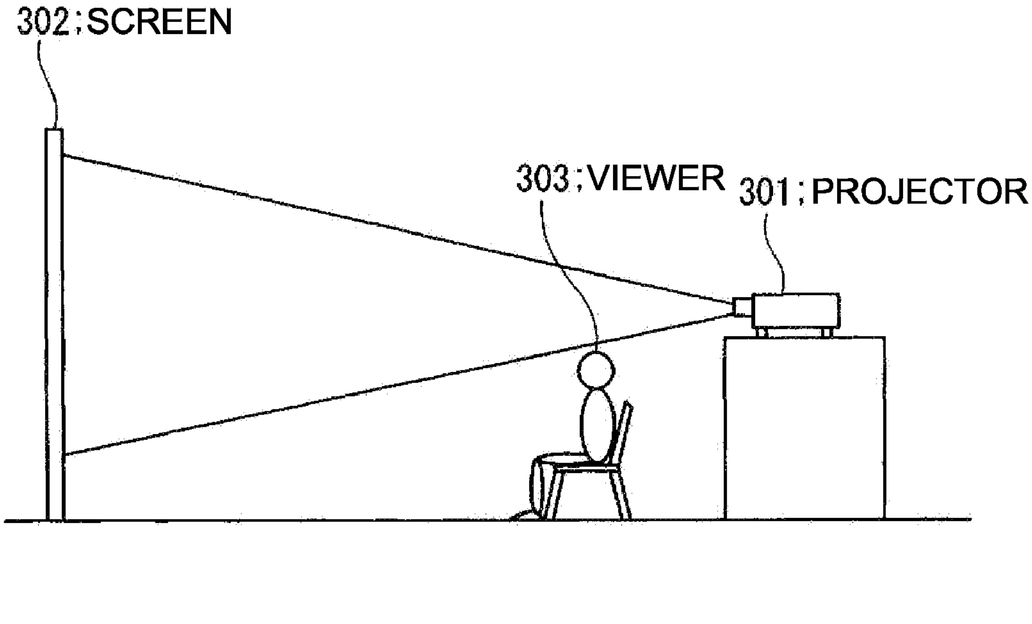
FIGS. 10A and 10B show a relation among the thickness of an insulating layer of an oscillation film, the thickness of an oscillation film holding part and the electrostatic capacity.
FIG. 11 illustrates a condition of using a projector in accordance with an embodiment of the invention.
Figure 17:
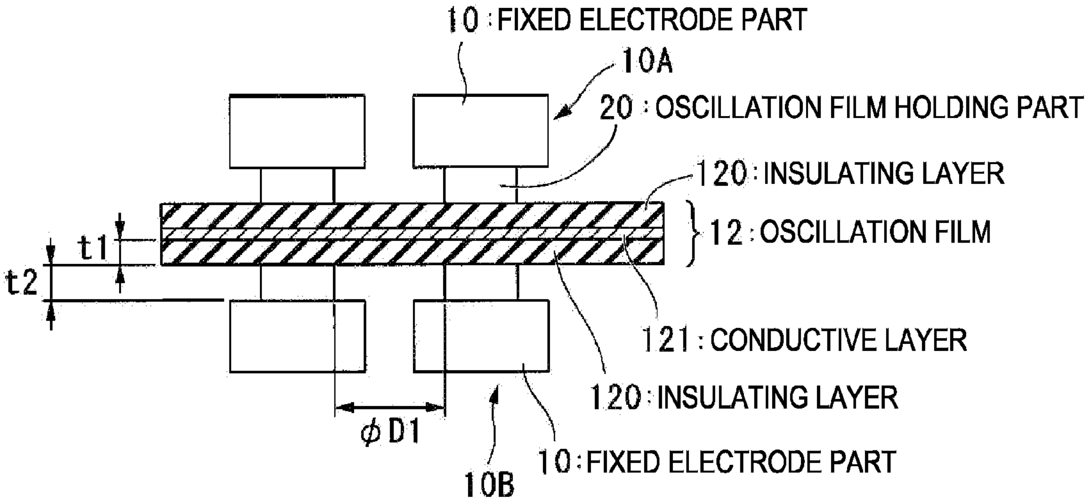
FIG. 17 illustrates improvement in characteristic in a manufacturing method in accordance with the invention.

FIGS. 10A and 10B show the ratio of electrostatic capacity for a conventional structure of the fixed electrode in the case that the insulating layer 120 of the oscillation film 12 is PET (the relative dielectric constant is 3.2) and its thickness (=the difference in step of the oscillation film holding part 20) is t1 while the oscillation film holding part 20 is polyimide (the relative dielectric constant is 3.5), its thickness (=the difference in step of the oscillation film holding part 20) is t2, the outer diameter of the oscillation film holding part 20 is ϕD1 and the inner diameter is a half of the outer diameter in a structure of the transducer in accordance with the embodiment of the invention (FIG. 17) for example.

As shown in FIGS. 10A and 10B, the smaller the thickness t1 of the insulating layer 120 of the oscillation film 12 is, the larger the effect of reduction in electrostatic capacity by forming the oscillation film holding part 20 from the insulating material is. Further, the larger the thickness t2 of the oscillation film holding part 20 is, the larger the effect of reduction in electrostatic capacity is.

As described above, only electric power to be given can be reduced without changing electrostatic force, so that an ultrasonic transducer improved in energy efficiency can be achieved.

Description of Example of Structure of Ultra-Directional Acoustic System or Display Device According to the Invention Now, described will be an ultra directional acoustic system using an ultrasonic speaker formed from a push-pull type electrostatic ultrasonic transducer. In the push-pull type electrostatic ultrasonic transducer, when it is assumed that the desired sound pressure outputted from the electrostatic ultrasonic transducer in accordance with the embodiment of the invention, namely, an electrostatic ultrasonic transducer is P (dB), the driving frequency is f (Hz) and a value of one side amplitude of the film oscillation of the oscillation film, which is being driven, is "a" (m), the value "a" of one side amplitude of the film oscillation is obtained by the following formula: $a=(1/\pi f)\sqrt{\{(I_o \cdot 10^{P/10})/2\rho_o c\}}$ wherein $I_o$ denotes the reference acoustic intensity, which is $0.96\times10^{-12}$ (W/m$^2$), $\rho_o$ is the density of the air, which is 1.2 (kg/m$^3$) and c denotes the sound speed in the air, which is around 340 (m/S) and the height of the step part, namely, the oscillation film holding part provided on the outer circumference of the thorough hole on the oscillation film side of each of the pair of fixed electrodes is set at a value exceeding and close to the one side amplitude value "a" (at least within a range that the oscillation film is not contact with the electrodes due to the film oscillation).

A projector will be exemplified hereinafter as an example of an ultra directional acoustic system or a display device in accordance with the invention. FIG. 11 shows a projector according to the invention, which is in use. As shown in FIG. 11, a projector 301 is provided behind a viewer 303. The projector 301 projects an image on a screen 302 provided on the front of the viewer 303 and forms a virtual sound source on a projection surface of the screen 302 by means of the ultrasonic speaker mounted to the projector 301 to reproduce the sound.

Figure 12A:
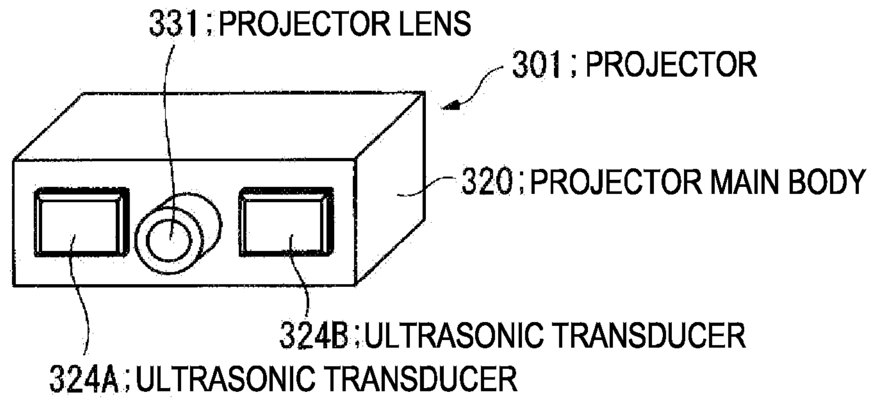
FIGS. 12A and 12B show a structure in external appearance of the projector shown in FIG. 11.
Figure 12B:
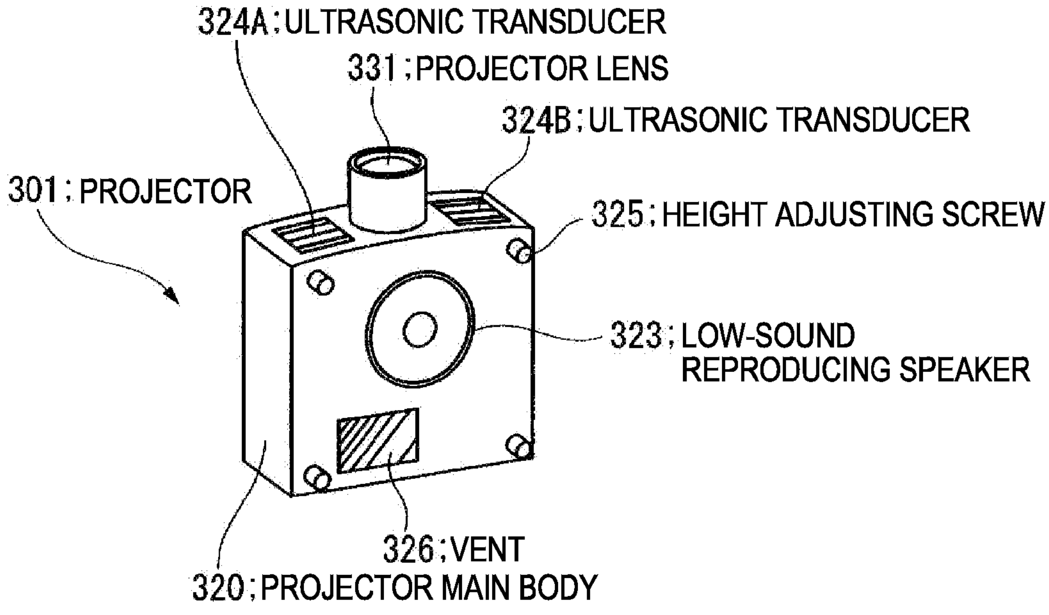

FIGS. 12A and 12B show an appearance of the projector 301. The projector 301 comprises a projector main body 320 including a projection optical system for projecting an image on the projection surface such as a screen and ultrasonic transducers 324A and 324B capable of oscillating a sound wave in the ultrasonic frequency band. The projector 301 is formed in one body with an ultrasonic speaker for reproducing a sound signal in an audible frequency band from a sound signal supplied from an acoustic source. In the embodiment, the ultrasonic transducers 324A and 324B forming the left and right ultrasonic speakers so as to sandwich a projector lens 331 forming a projection optical system are mounted in a main body of the projector for the purpose of reproducing a stereo sound signal.

Further, on the bottom surface of the projector main body 320, provided is a speaker 323 for reproducing a low tone. 325 denotes a height adjusting screw for adjusting the height of the projector main body 320. 326 denotes a vent for air-cooling fan.

In the projector 301, used is a push-pull type electrostatic ultrasonic transducer in accordance with one embodiment of the invention as an ultrasonic transducer forming an ultrasonic speaker and an acoustic signal in a wide frequency band (a sound wave in an ultrasonic frequency band) can be oscillated at high sound pressure. Accordingly, controlling a spatial reproducing range of a reproduced signal in an audible frequency band by changing the frequency of the carrier wave allows an acoustic effect achieved by means of stereo surround-sound system, 5.1 ch surround-sound system or such to be achieved without a conventionally required large-scale acoustic system and a projector which can be easily carried, to be achieved.

Figure 13:
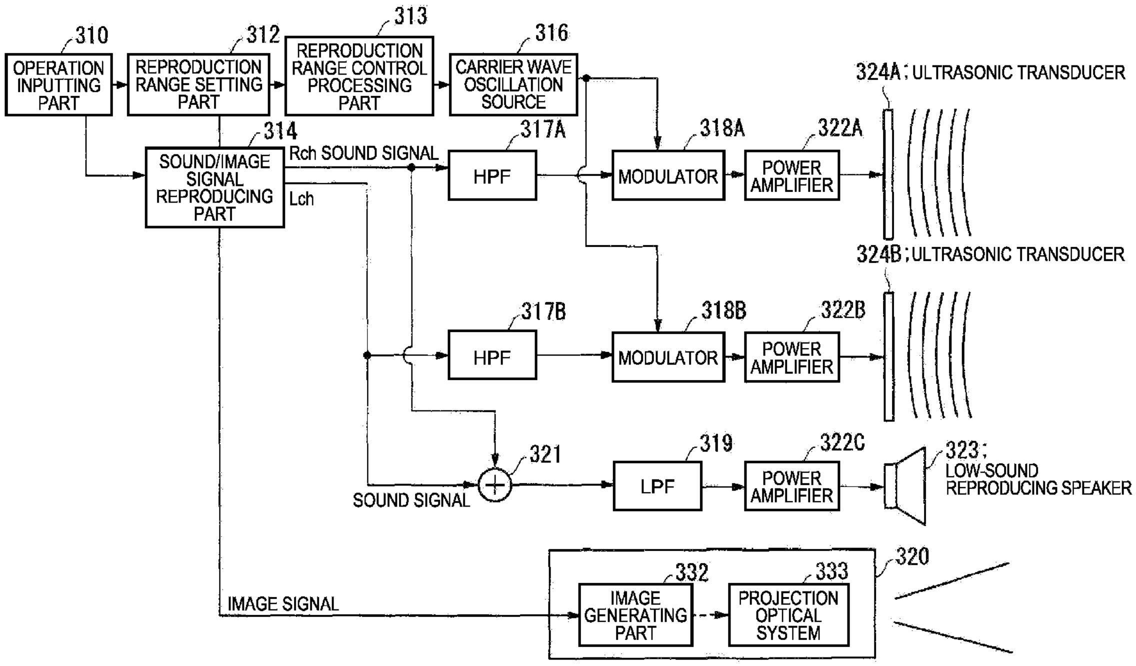
FIG. 13 is a block diagram showing an electric structure of the projector shown in FIG. 11.

FIG. 13 shows an electrical structure of the projector 301. The projector 301 includes: an operation inputting part 310; an ultrasonic speaker comprising a reproducing range setting part 312, a reproduction range control processing part 313, a sound/image signal reproducing part 314, a carrier wave oscillation source 316, modulators 318A and 318B and power amplifiers 322A and 322B; high-pass filters 317A and 317B; a low-pass filter 319; an adder 321; a power amplifier 322C; a low-sound reproducing speaker 323; and a projector main body 320. The electrostatic ultrasonic transducers 324A and 324B are a push-pull type electrostatic ultrasonic transducer in accordance with one embodiment of the invention.

The projector main body 320 includes an image generating part 332 for generating an image and a projection optical system for projecting the generated image on a projection surface. The projector 301 comprises the ultrasonic speaker, the low-sound reproducing speaker 323 and the projector main body 320, which are formed into one body.

The operation inputting part 310 includes respective function keys including a numeric keypad, numeric keys and a power source key for turning on and off the power source. The reproduction range setting part 312 is arranged to be able to input data for designating a reproduction range of a reproduction signal (a signal sound) by a key operation of the operation inputting part 310 by a user. It is arranged that the carrier wave defining the reproduction range of the reproduction signal be set and held when the data is inputted. Designating the distance from a sound wave radiating surface of the ultrasonic transducers 324A and 324B to a point where the reproduced signal arrives in a direction of a radiating axis allows the reproduction range of the reproduction signal to be set.

The reproduction range setting part 312 is arranged to be able to set a frequency of the carrier wave by means of the controlling signal outputted from the sound/image signal reproducing part 314 in accordance with contents of an image.

The reproduction range controlling process part 313 has a function of referring the set contents of the reproduction range setting part 312 to control the carrier wave oscillation source 316 to change the frequency of the carrier wave generated by the carrier wave oscillation source 316 so that the frequency of the carrier wave would be in the set reproduction range.

For example, in the case that the distance corresponding to 50 kHz of the carrier wave frequency is set as inner information of the reproduction range setting part 312, the carrier wave oscillation source 316 is controlled to perform oscillation at 50 kHz.

The reproduction range control processing part 313 includes a storing part in which a table showing the distance a relation between from a sound wave radiating surface of the ultrasonic transducers 324A and 324B to a point where the reproduced signal arrives in a direction of a radiating axis and the frequency of the carrier wave is stored in advance. The data of the table can be obtained by practically measuring the relation between the frequency of the carrier wave and the distance that the reproduced signal reaches.

The reproduction range control processing part 313 calculates the frequency of the carrier wave corresponding to the distance information set with reference to the table to control the carrier wave oscillation source 316 to be the frequency on the basis of the set contents of the reproduction range setting part 312.

The sound/image signal reproducing part 314 is a DVD player using a DVD as an image media, for example. Among the reproduced signals, the sound signal in the R channel is outputted to the modulator 318A through the high-pass filter 317A, the sound signal in the L channel is outputted to the modulator 318B through the high-pass filter 317B and the image signal is outputted to the image reproducing part 332 of the projector main body 320.

The sound signals in the R channel and the L channel outputted from the sound/image signal reproducing part 314 are compounded in the adder 321 to be inputted to the power amplifier 322C through the low-pass filter 319. The image/sound signal reproducing part 314 corresponds to the acoustic source.

The high-pass filters 317A and 317B have a characteristic that the frequency components of the sound signals in the R and L channels in the middle and high sound range only pass through the high-pass filters, respectively. The low-pass filter has a characteristic that the frequency components of the sound signals in the R and L channels in the low sound range only pass through the low-pass filter.

Accordingly, the sound signals in the R and L channels in the middle and high sound range are reproduced by means of the ultrasonic transducers 324A and 324B, respectively, while the sound signals in the R and L channels in the low sound range are reproduced by means of the low-sound reproducing speaker 323.

The sound/image signal reproducing part 314 is not limited to a DVD player but may be a reproducing apparatus for reproducing a video signal inputted from the outside. The sound/image signal reproducing part 314 has a function of outputting a controlling signal for instructing the reproduction range setting part 312 on the reproduction range so that the reproduction range of the reproduced sound would be dynamically changed for the purpose of achieving an acoustic effect corresponding to a scene of an image to be reproduced.

The carrier wave oscillation source 316 has a function of generating a carrier wave having the frequency of the ultrasonic frequency band, which is directed by the reproduction range setting part 312 to output the generated carrier wave to the modulators 318A and 318B.

The modulators 318A and 318B has a function of AM-modulating the carrier wave supplied from the carrier wave oscillation source 316 with the sound signals of the audible frequency band outputted from the sound/image signal reproducing part 314 to output the modulated signals to the power amplifiers 322A and 322B, respectively.

The ultrasonic transducer 324A and 324B are driven by means of the modulated signals outputted from the modulators 318A and 318B through the power amplifiers 322A and 322B. The ultrasonic transducer 324A and 324B have a function of converting the modulated signals into the sound wave at the limited amplitude level and radiates the same into a medium to reproduce the signal sound in the audible frequency band (the reproduced sound).

The image generating part 332 includes a display such as a liquid crystal display or a plasma display panel (PDP) and a driving circuit for driving the display on the basis of an image signal outputted from the image/sound reproducing part 314. The image generating part 332 generates an image obtained from an image signal outputted from the sound/image signal reproducing part 314.

The projection optical system 333 has a function of projecting an image displayed on the display on a projection surface such as a screen provided in the front of the projector main body 320.

Now, an operation of the projector 301 having the above structure will be described. First, a user operates a key to set the data designating the reproduction range of the reproduced signal (the distance information) by means of the operation inputting part 310 in the reproduction range setting part 312. The sound/image signal reproducing part 314 is instructed to carry out reproduction.

This results in setting of the distance information defining the reproduction range in the reproduction range setting part 312. The reproduction range control processing part 313 takes in the distance information set in the reproduction range setting part 312, refers the table stored in the built-in storing part, calculates the frequency of the carrier wave corresponding to the set distance information and controls the carrier wave oscillation source 316 to generate the carrier wave having the frequency.

As a result, the carrier wave oscillation source 316 generates the carrier wave having the frequency corresponding to the distance information set in the reproduction range setting part to output the generated carrier wave to the modulators 318A and 318B.

On the other hand, the sound/image signal reproducing part 314 outputs the reproduced sound signal in the R channel to the modulator 318A through the high-pass filter 317A, the reproduced sound signal in the L channel to the modulator 318B through the high-pass filter 317B, the sound signals in the R and L channels to the adder 321 and the image signal to the image reproducing part 332 of the projector main body 320.

Accordingly, the sound signal in the R channel in the middle and high sound range is inputted to the modulator 318A through the high-pass filter 317A while the sound signal in the L channel in the middle and high sound range is inputted to the modulator 318B through the high-pass filter 317B.

The sound signals in the R and L channels are composed by means of the adder 321. The sound signals in the R and L channels in the low sound range are inputted to the power amplifier 322C through the low-pass filter 319.

The image generating part 332 drives the display on the basis of the inputted image signal to generate and display an image. The image displayed on the display is projected on a projection surface, a screen 302 shown in FIG. 11, for example, by means of the projection optical system 333.

On the other hand, the modulator 318A AM-modulates the carrier wave outputted from the carrier wave oscillation source 316 with the signal in the R channel in the middle and high sound range, which is outputted from the high-pass filter 317A, to output the modulated wave to the power amplifier 322A.

The modulator 318B AM-modulates the carrier wave outputted from the carrier wave oscillation source 316 with the signal in the L channel in the middle and high sound range, which is outputted from the high-pass filter 317B, to output the modulated wave to the power amplifier 322B.

The modulated signals amplified by means of the power amplifiers 322A and 322B are respectively applied between the upper electrode 10A and the lower electrode 10B (refer to FIG. 1) of the ultrasonic transducers 324A and 324B. The modulated signals are converted into the sound wave at a limited amplitude level (an acoustic signal) to be radiated to the medium (in the air). The sound signal in the R channel in the middle and high sound range is reproduced from the ultrasonic transducer 324A while the sound signal in the L channel in the middle and high sound range is reproduced from the ultrasonic transducer 324B.

The sound signals in the R and L channels in the low sound range, which is amplified by means of the power amplifier 322C, are reproduced by means of the low-sound reproducing speaker 323.

As described above, in transmission of an ultrasonic wave radiated in the medium (the air) by means of an ultrasonic transducer, the sound speed is high at a part where the sound pressure is high while it is low at a part where the sound pressure is low, in accordance with the transmission. This results in distortion of a waveform.

In the case that a signal in an ultrasonic band, which is to be radiated, has been modulated (AM-modulated) with a signal in an audible frequency band, a signal wave of the audible frequency band used in modulation is formed so that it would be separated from the carrier wave of the ultrasonic frequency band and self-demodulated as a result of the distortion of the waveform. At that time, the reproduced signals spread in the shape of a beam due to a characteristic of the ultrasonic wave, so that a sound is reproduced only in a direction entirely different from a usual speaker.

The beam-shaped reproduced signal outputted from the ultrasonic transducer 324 forming an ultrasonic speaker is radiated to the projection surface (a screen) on which an image is projected by means of the projection optical system 333. The radiated signal is reflected on the projection surface to be scattered. In this case, the reproduction range varies since the beam width (an angle that the beam spreads) of the carrier wave is different in accordance with the frequency of the carrier wave set in the reproduction range setting part 312 in the distance from the sound wave radiating surface of the ultrasonic transducer 324 to a point where the reproduced signal is separated from the carrier wave in a direction of a radiation axis (in a direction of a normal).

Figure 14:
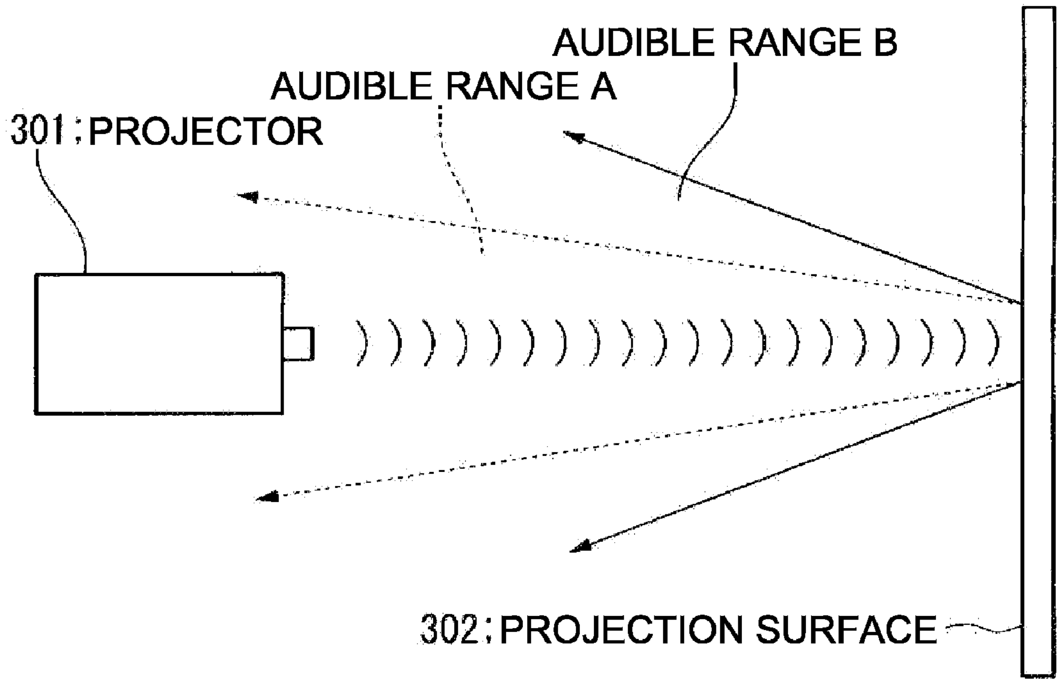
FIG. 14 illustrates reproduction of a reproduced signal by means of an ultrasonic transducer.

FIG. 14 shows the reproduced signal in reproduction from the ultrasonic speaker comprising the ultrasonic transducers 324A and 324B of the projector 301. In the projector 301, when the carrier frequency set by means of the reproduction range setting part 312 is low in driving the ultrasonic transducer on the basis of the modulated signal formed from the carrier wave modulated with the sound signal, the distance from the sound wave radiation surface of the ultrasonic transducer 324 to a point where the reproduced signal is separated from the carrier wave in a direction of the radiation axis (in a direction of a normal of the sound wave radiation surface), namely, the distance to the reproduction point becomes long.

Accordingly, a reproduced beam of the reproduced signal in the audible frequency band reaches the projection surface (the screen) 302 with little spreading and is reflected on the projection surface 302 in this condition. The reproduction range is thus an audible range A shown by an arrow in a dotted line in FIG. 14. The reproduced signal (the reproduced sound) can be only hear in a narrow range comparatively far from the projection surface 302.

On the other hand, when the carrier frequency set by means of the reproduction range setting part 312 is higher than the above-mentioned case, the sound wave radiated from the sound wave radiation surface of the ultrasonic transducer 324 is narrowed down more than the case of the low carrier frequency but the distance from the sound wave radiation surface of the ultrasonic transducer 324 to a point where the reproduced signal is separated from the carrier wave in a direction of the radiation axis (in a direction of a normal of the sound wave radiation surface), namely, the distance to the reproduction point becomes short.

Accordingly, a reproduced beam of the reproduced signal in the audible frequency band spreads before reaching the projection surface 302, and then, reaches the projection surface 302. The reflection is carried out on the projection surface 302 in this condition. Accordingly, the reproduction range is an audible range B shown by an arrow in a solid line in FIG. 14. The reproduced signal (the reproduced sound) can be only hear in a narrow range relatively close to the projection surface 302.

As described above, in the projector in accordance with the invention, used is an ultrasonic speaker using a push-pull type electrostatic ultrasonic transducer according to the invention and an acoustic signal can be reproduced with a sufficient sound pressure and a wide band characteristic so as to be generated from a virtual sound source formed in the vicinity of the sound wave reflection surface such as a screen. This allows control of the reproduction range to be easily performed.

Figure 18:
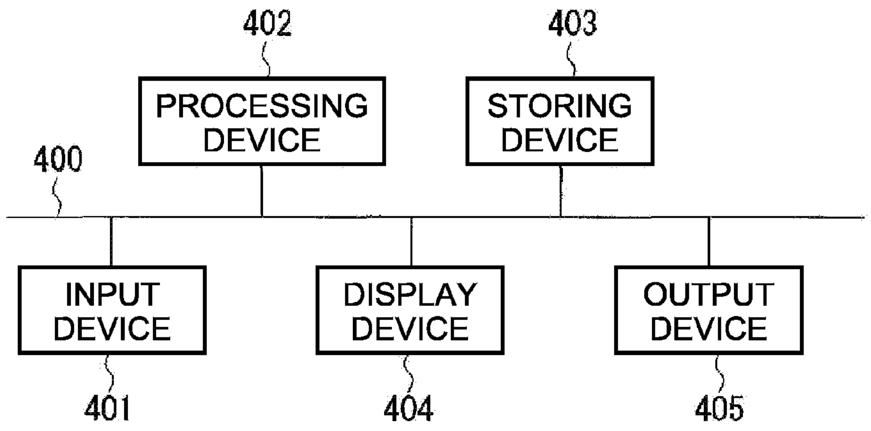
FIG. 18 is a block diagram showing a structure of an electrostatic ultrasonic transducer in accordance with an embodiment of the invention.

Description of Example of Structure of Designing Apparatus of Electrostatic Ultrasonic Transducer According to the Invention Now, an apparatus for designing the above-mentioned electrostatic ultrasonic transducer in accordance with the invention will be described. FIG. 18 shows a structure of an apparatus for designing the electrostatic ultrasonic transducer in accordance with the embodiment of the invention. In FIG. 18, the designing apparatus of the electrostatic ultrasonic transducer in accordance with the embodiment of the invention includes an input device 401, a processing device 402, a storing device 403 in which a program for designing the electrostatic ultrasonic transducer is stored, a display device 404 and an output device 405. The input device 401, the processing device 402, the storing device 403, the display device 404 and the output device 405 are connected to each other through a bus 400.

The input device 401 includes an inputting means such as a keyboard and a mouse and is used for inputting a value of each parameter necessary to designing the electrostatic ultrasonic transducer.

Figure 19:
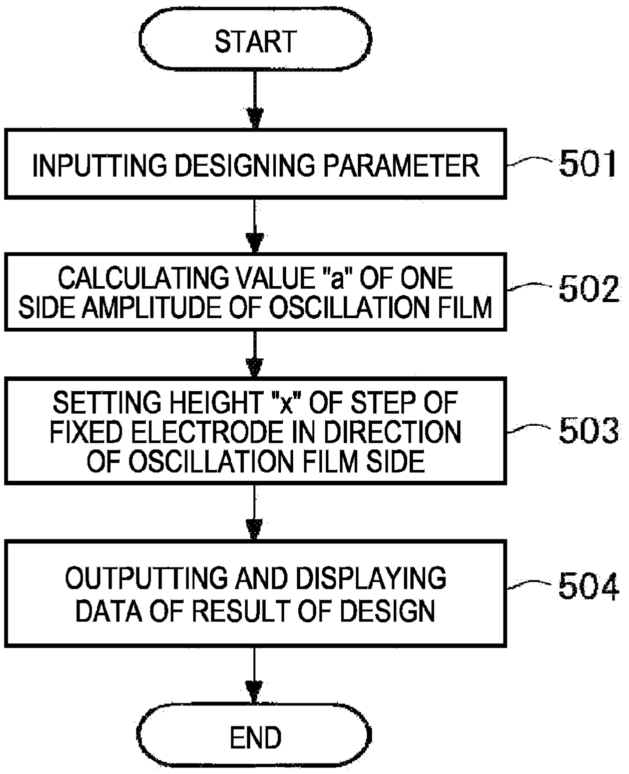
FIG. 19 is a flowchart showing contents of a program for designing an electrostatic ultrasonic transducer in accordance with an embodiment of the invention.

A program for designing the electrostatic ultrasonic transducer is stored in the storing device 403. The designing program is a program for an electrostatic ultrasonic transducer including: a first electrode in which plural through holes are formed; a second electrode in which plural through holes are formed; the second electrode forming a pair with the first electrode; an oscillation film, which is sandwiched between the pair of electrodes and has a conductive layer to which the direct current bias voltage is applied; and a holding member for holding the pair of fixed electrode and the oscillation film, wherein a alternating current signal is applied between the pair of electrodes. The designing program is characterized by letting a computer execute a first step for calculating a value "a" of one side amplitude of the film oscillation by the following formula: $a=(1/\pi f)\sqrt{\{(I_o\cdot 10^{P/10})/2\rho_o c\}}$, wherein $I_o$ denotes the reference acoustic intensity, which is $0.96\times10^{-12}$ (W/m$^2$), $\rho_o$ is the density of the air, which is 1.2 (kg/m$^3$) and c denotes the sound speed in the air, which is around 340 (m/S), when it is assumed that the desired sound pressure outputted from the electrostatic ultrasonic transducer is P (dB), the driving frequency is f (Hz) and a value of one side amplitude of the film oscillation of the oscillation film, which is being driven, is "a" (m) and a second step of setting the height of a step part, which is provided on the outer periphery of the through hole on the respective oscillation film sides of the pair of electrodes as an oscillation film holding part, in the direction of the oscillation film side at a value close to the value "a" of one side amplitude. FIG. 19 shows contents of the designing program.

The processing device 402 reads out the designing program of the electrostatic ultrasonic transducer, which is stored in the storing device 403, to execute the designing program. The processing device 402 corresponds to an operating means and a setting means in the invention.

The display device 404 displays contents of the various kinds of data and steps of the designing process.

The output device is a printer, for example, and prints out the contents of the various kinds of data and the steps of the designing process on the basis of an output instruction.

An operation of the apparatus for designing the electrostatic ultrasonic transducer in accordance with the embodiment of the invention, the apparatus having the above structure, will be now described, made reference to a flowchart shown in FIG. 19. In FIG. 19, after starting the designing program, inputted is a value of the various kinds of parameter necessary to designing the electrostatic ultrasonic transducer shown in FIG. 1 by means of the input device 401 (Step 501). The processing device 402 then calculates a value "a" of one side amplitude of the film oscillation by the following formula: $a=(1/\pi f)\sqrt{\{(I_o\cdot 10^{P/10})/2\rho_o c\}}$, wherein $I_o$ denotes the reference acoustic intensity, which is $0.96\times10^{-12}$ (W/m$^2$), $\rho_o$ is the density of the air, which is 1.2 (kg/m$^3$) and c denotes the sound speed in the air, which is around 340 (m/S), when it is assumed that the desired sound pressure outputted from the electrostatic ultrasonic transducer is P (dB), the driving frequency is f (Hz) and the value of one side amplitude of the film oscillation of the oscillation film, which is being driven, is "a" (m).

Further, the processing device 402 sets the height of a step part, which is provided in the outer periphery of the through hole on the respective oscillation film sides of the pair of electrodes as an oscillation film holding part, in a direction of the oscillation film side at a value exceeding and close to the value "a" of one side amplitude (Step 503). The designing data obtained in such a designing process is outputted from the processing device 402 to the display device 404 and the output device 405 to be displayed on a display screen of the display device 404 and also printed out from a printer used as the output device 405.

The embodiments of the invention have been described above. An electrostatic ultrasonic transducer, a method of reproducing a sound signal by means of the electrostatic ultrasonic transducer, a method of manufacturing the electrostatic ultrasonic transducer, an ultrasonic speaker, an ultra directional acoustic system, a display device, a method of designing the electrostatic ultrasonic transducer, an apparatus for designing the electrostatic ultrasonic transducer and a program for designing the electrostatic ultrasonic transducer in accordance with the invention are not limited to the above-mentioned examples shown in the drawings. Various kinds of modification can be considered, of course, within a range not deviating from the spirit of the invention.

The ultrasonic transducer in accordance with the embodiments of the invention is applicable to various kinds of sensors such as a distance measuring sensor, for examples as well as a sound source for a directional speaker and an ideal impulse signal generating source as described above. It is also useful for an ultra directional acoustic system and a display device such as a projector.

The entire disclosure of Japanese Patent Application Nos: 2005-279251, filed Sep. 27, 2005 and 2006-190587, filed Jul. 11, 2006 are expressly incorporated by reference herein.

What is claimed is:

1. An electrostatic ultrasonic transducer comprising:

a first electrode provided with a through hole;

a second electrode provided with a through hole forming a pair with the through hole of the first electrode wherein an alternating current signal is applied between the first electrode and the second electrode;

an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula:

$$a=(1/\pi f)\sqrt{\{(I_o\cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and the value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a".

2. An ultrasonic speaker comprising:

an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula:

$$a=(1/\pi f)\sqrt{\{(I_o \cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a";

a signal source for generating a signal wave in an audible frequency band;

a carrier wave supplying unit for generating and outputting a carrier wave in an ultrasonic frequency band; and a modulating unit for modulating the carrier wave by means of the signal wave in the audible frequency band, the signal wave being outputted from the signal source, wherein the electrostatic ultrasonic transducer is driven on the basis of a modulated signal applied between the fixed electrode and an electrode layer of the oscillation film and outputted from the modulating unit.

3. A display device comprising:

an ultrasonic speaker for reproducing a signal sound in an audible frequency band from a sound signal supplied from an acoustic source; and a projection optical system for projecting an image on a projection surface, wherein the ultrasonic speaker includes an electrostatic ultrasonic transducer including: a first electrode provided with a through hole; a second electrode provided with a through hole forming a pair with the through hole of the first electrode wherein an alternating current signal is applied between the first electrode and the second electrode; an oscillation film sandwiched between the pair of electrodes and having a conductive layer wherein a direct current bias voltage is applied to the conductive layer; and a holding member for holding the pair of electrodes and the oscillation film, wherein a value "a" of one side amplitude of the film oscillation is obtained by the following formula:

$$a=(1/\pi f)\sqrt{\{(I_o \cdot 10^{P/10})/2\rho_o c\}}$$

wherein $I_o$ denotes the reference acoustic intensity, the reference acoustic intensity being $0.96\times10^{-12}$ (W/m$^2$), $\rho_o$ is the density of the air, the density of the air being 1.2 (kg/m$^3$) and c denotes the sound speed in the air, the sound speed in the air being around 340 (m/S), when it is assumed that the outputted desired sound pressure is P (dB), the driving frequency is f (Hz) and a value of one side amplitude of the film oscillation of the oscillation film, which is being driven, is "a" (m), and a height of a step part provided in an outer circumference of the through hole on the respective oscillation film sides of the pair of electrodes in a direction of the oscillation film side is set at a value exceeding and close to the one side amplitude value "a".

* * * * *